United States Patent
Chapman

(10) Patent No.: US 9,883,073 B2
(45) Date of Patent: Jan. 30, 2018

(54) SYSTEM AND METHOD FOR PRODUCING SEESAW GLOSS EFFECT AND RECORDING MEDIUM WITH SEESAW GLOSS EFFECT

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/662,445

(22) Filed: Jul. 28, 2017

(65) Prior Publication Data

US 2017/0324882 A1    Nov. 9, 2017

Related U.S. Application Data

(62) Division of application No. 14/951,663, filed on Nov. 25, 2015, now Pat. No. 9,756,212.

(51) Int. Cl.
*H04N 1/32* (2006.01)
*H04N 1/60* (2006.01)

(52) U.S. Cl.
CPC ....... *H04N 1/32309* (2013.01); *H04N 1/6008* (2013.01); *H04N 2201/0094* (2013.01); *H04N 2201/325* (2013.01)

(58) Field of Classification Search
CPC ............. H04N 1/3232; H04N 1/32293; H04N 1/32288; H04N 1/32352; H04N 2201/327
USPC ..................... 358/2.1, 3.28, 1.9; 347/98, 107
See application file for complete search history.

(56) References Cited

U.S. PATENT DOCUMENTS

| | | | |
|---|---|---|---|
| 4,112,189 | A | 9/1978 | Terwilliger |
| 5,286,286 | A | 2/1994 | Winnik et al. |
| 5,734,752 | A | 3/1998 | Knox |
| 6,172,767 | B1 | 1/2001 | Takemoto |
| 6,212,805 | B1 | 4/2001 | Hill |
| 7,092,128 | B2 | 8/2006 | Wang et al. |
| 7,324,241 | B2 | 1/2008 | Eschbach et al. |
| 7,391,529 | B2 | 6/2008 | Glaspy, Jr. et al. |
| 7,580,153 | B2 | 8/2009 | Eschbach et al. |
| 7,639,400 | B2 | 12/2009 | Hains |

(Continued)

FOREIGN PATENT DOCUMENTS

| | | |
|---|---|---|
| CA | 2788413 | 8/2011 |
| EP | 258716 | 1/2011 |
| WO | WO2011091969 | 8/2011 |

OTHER PUBLICATIONS

"Detecting Counterfeit Money, Part II: Color-Shifting Numbers," (See Document for full citation) Jun. 27, 2010.

(Continued)

*Primary Examiner* — Jamares Q Washington
(74) *Attorney, Agent, or Firm* — Michael J. Nickerson; Basch & Nickerson LLP

(57) ABSTRACT

A system and method render see-saw scalable gloss effect image patterns on a recording medium by using to two colors to provide one region with a relatively smooth surface, while a second region has a relatively rougher surface. A third region is added composed of a color different than the first two, wherein the third region has a relatively smooth surface where it intersects with the first region and a relatively rougher surface where it intersects with the second region. As the rendered recording medium is tilted at different angles, the image patterns thereon toggle to create a see-saw effect.

14 Claims, 24 Drawing Sheets

(56) References Cited

U.S. PATENT DOCUMENTS

| | | | |
|---|---|---|---|
| 7,703,809 B2 | 4/2010 | Zaitsevsky | |
| 7,852,515 B2 | 12/2010 | Eschbach et al. | |
| 7,922,209 B1 | 4/2011 | Beretta | |
| 8,064,100 B2 | 11/2011 | Braun et al. | |
| 8,098,880 B2 | 1/2012 | Wang | |
| 8,111,432 B2 | 2/2012 | Eschbach et al. | |
| 8,147,932 B2 | 4/2012 | Despland et al. | |
| 8,248,661 B2 | 8/2012 | Wang et al. | |
| 8,310,718 B2 | 11/2012 | Chapman | |
| 8,355,167 B2 | 1/2013 | Chapman et al. | |
| 8,675,259 B2 | 3/2014 | Chapman et al. | |
| 8,797,602 B2 | 8/2014 | Chapman et al. | |
| 8,894,098 B2 | 11/2014 | MacPherson et al. | |
| 8,896,886 B2 | 11/2014 | Chapman et al. | |
| 9,082,068 B1 | 7/2015 | Chapman | |
| 9,083,896 B2 | 7/2015 | Chapman | |
| 9,085,190 B2 | 7/2015 | Andres | |
| 9,088,736 B2 | 7/2015 | Miller et al. | |
| 9,100,592 B2 | 8/2015 | Chapman | |
| 9,106,847 B2 | 8/2015 | Miller et al. | |
| 9,118,870 B2 | 8/2015 | Chapman | |
| 9,148,546 B2 | 9/2015 | Chapman et al. | |
| 9,193,201 B2 | 11/2015 | Chapman | |
| 9,237,253 B2 | 1/2016 | Chapman et al. | |
| 9,264,575 B1 | 2/2016 | Chapman | |
| 9,282,215 B2 | 3/2016 | Chapman et al. | |
| 9,538,041 B1 | 1/2017 | Chapman | |
| 2002/0160194 A1 | 10/2002 | Phillips et al. | |
| 2003/0021437 A1 | 1/2003 | Hersch et al. | |
| 2003/0170471 A1 | 9/2003 | Seto et al. | |
| 2003/0184613 A1 | 10/2003 | Nakamura et al. | |
| 2003/0231349 A1 | 12/2003 | Wang et al. | |
| 2004/0000786 A1 | 1/2004 | Xu et al. | |
| 2004/0001233 A1 | 1/2004 | Wang et al. | |
| 2004/0071365 A1 | 4/2004 | Zhang | |
| 2004/0114160 A1 | 6/2004 | Wang et al. | |
| 2004/0156078 A1 | 8/2004 | Wang et al. | |
| 2005/0067497 A1 | 3/2005 | Jones et al. | |
| 2005/0082705 A1 | 3/2005 | Hersch et al. | |
| 2005/0109850 A1* | 5/2005 | Jones ................ | G06K 19/08 235/487 |
| 2006/0072159 A1 | 4/2006 | Eschbach et al. | |
| 2007/0017990 A1 | 1/2007 | Katsurabayashi | |
| 2007/0139680 A1 | 6/2007 | Eschbach et al. | |
| 2007/0139681 A1 | 6/2007 | Eschbach et al. | |
| 2007/0200002 A1 | 8/2007 | Raksha et al. | |
| 2007/0201116 A1 | 8/2007 | Wicker et al. | |
| 2007/0201720 A1 | 8/2007 | Rodriguez et al. | |
| 2007/0262579 A1 | 11/2007 | Bala et al. | |
| 2007/0281140 A1 | 12/2007 | Haubrich et al. | |
| 2008/0079971 A1 | 4/2008 | Liu et al. | |
| 2008/0080000 A1 | 4/2008 | Kadota | |
| 2008/0122217 A1 | 5/2008 | Rancien et al. | |
| 2008/0122218 A1 | 5/2008 | Reid et al. | |
| 2008/0134920 A1 | 6/2008 | Foresti et al. | |
| 2008/0299333 A1 | 12/2008 | Bala et al. | |
| 2008/0301767 A1 | 12/2008 | Picard | |
| 2008/0302263 A1 | 12/2008 | Eschbach et al. | |
| 2009/0072185 A1 | 3/2009 | Raksha et al. | |
| 2009/0207433 A1 | 8/2009 | Wang et al. | |
| 2009/0262400 A1 | 10/2009 | Eschbach et al. | |
| 2010/0128321 A1 | 5/2010 | Wang et al. | |
| 2010/0214595 A1 | 8/2010 | Chapman et al. | |
| 2010/0238513 A1 | 9/2010 | Morales et al. | |
| 2011/0127331 A1 | 6/2011 | Zhao et al. | |
| 2011/0191670 A1 | 8/2011 | Hoppenot et al. | |
| 2011/0205569 A1 | 8/2011 | Eschbach et al. | |
| 2012/0140290 A1 | 6/2012 | Eschbach et al. | |
| 2012/0311905 A1 | 12/2012 | Dodd et al. | |
| 2013/0113200 A1 | 5/2013 | Lister | |
| 2013/0128319 A1 | 5/2013 | Kenehan | |
| 2013/0161939 A1 | 6/2013 | Kasperchik et al. | |
| 2014/0085392 A1 | 3/2014 | Chapman et al. | |
| 2014/0334665 A1 | 11/2014 | Quinn et al. | |
| 2015/0077803 A1 | 3/2015 | Chapman | |
| 2015/0077804 A1 | 3/2015 | Chapman | |
| 2015/0077805 A1 | 3/2015 | Miller et al. | |
| 2015/0077806 A1 | 3/2015 | Miller et al. | |
| 2015/0077807 A1 | 3/2015 | Chapman et al. | |
| 2015/0077810 A1 | 3/2015 | Chapman | |
| 2015/0079357 A1 | 3/2015 | Chapman | |
| 2015/0116321 A1 | 4/2015 | Fortner | |
| 2015/0224791 A1 | 8/2015 | Chapman | |
| 2015/0224803 A1 | 8/2015 | Miller et al. | |
| 2015/0229803 A1 | 8/2015 | Chapman et al. | |
| 2015/0229805 A1 | 8/2015 | Miller et al. | |
| 2016/0189326 A1 | 6/2016 | Rodriguez et al. | |

OTHER PUBLICATIONS

Co-pending U.S. Appl. No. 14/694,174, filed Apr. 23, 2015.
Co-pending U.S. Appl. No. 14/694,525, filed Apr. 23, 2015.
Co-pending U.S. Appl. No. 14/694,549, filed Apr. 23, 2015.
Co-pending U.S. Appl. No. 14/030,025, filed Sep. 18, 2013.
Co-pending U.S. Appl. No. 14/030,032, filed Sep. 18, 2013.
Co-pending U.S. Appl. No. 14/030,038, filed Sep. 18, 2013.
Co-pending U.S. Appl. No. 14/030,046, filed Sep. 18, 2013.
Co-pending U.S. Appl. No. 14/030,054, filed Sep. 18, 2013.
Office Action for Co-Pending U.S. Appl. No. 14/030,025, dated Jan. 30, 2015.
Office Action for Co-Pending U.S. Appl. No. 14/030,032, dated Feb. 23, 2015.
Office Action for Co-Pending U.S. Appl. No. 14/030,038, dated Jan. 30, 2015.
Office Action for Co-Pending U.S. Appl. No. 14/030,046, dated Jan. 30, 2015.
Office Action for Co-Pending U.S. Appl. No. 14/030,054 dated Feb. 13, 2015.
Office Action for Co-Pending U.S. Appl. No. 14/030,062, dated Feb. 13, 2015.
Co-pending U.S. Appl. No. 14/030,020, filed Sep. 18, 2013.
Co-pending U.S. Appl. No. 14/694,571, filed Apr. 23, 2015.
Co-pending U.S. Appl. No. 14/030,062, filed Sep. 18, 2013.
Co-Pending U.S. Appl. No. 14/951,677, filed Nov. 25, 2015.
Co-Pending U.S. Appl. No. 14/951,706, filed Nov. 25, 2015.
Co-Pending U.S. Appl. No. 14/951,695, filed Nov. 25, 2015.
Co-Pending U.S. Appl. No. 14/951,717, filed Nov. 25, 2015.
Co-Pending U.S. Appl. No. 14/951,663, filed Nov. 25, 2015.
Co-Pending U.S. Appl. No. 15/144,087, filed May 2, 2016.
Co-pending U.S. Appl. No. 15/171,043, filed Jun. 2, 2016.

* cited by examiner

SYSTEM AND METHOD FOR PRODUCING SEESAW GLOSS EFFECT AND RECORDING MEDIUM WITH SEESAW GLOSS EFFECT

PRIORITY INFORMATION

The present application is a divisional of U.S. patent application Ser. No. 14/951,663, filed on Nov. 25, 2015, and claims priority, under 35 U.S.C. § 120, from U.S. patent application Ser. No. 14/951,663, filed on Nov. 25, 2015.

BACKGROUND

In conventional printing processes, requiring security measures, a pattern color space having specialty imaging characteristics have been utilized to provide the security measures and prevent counterfeiting of printed materials.

In addition, in conventional printing processes, a pattern color space has been utilized, in part on variable data, such as printing logos, serial numbers, seat locations, or other types of unique identifying information on printed materials.

In security applications, it is desirable to add information to a document that prevents or hinders alterations and counterfeiting. These security elements may conflict with the overall aesthetics of the document.

Specialty imaging has been used, conventionally, in printed materials to provide fraud protection and anti-counterfeiting measures. Some examples are in prescriptions, contracts, documents, coupons, and tickets. Typically, several specialty imaging techniques are used at various positions in a document. However, specialty imaging text techniques take up space in the document.

One example of a conventional specialty imaging technique restricts designers to use rectangular areas for security elements of documents. This may be acceptable for locating security elements in headers, footers, or similar areas of documents. However, rectangular security elements may not be as "pleasing" in other document areas.

With reference to FIGS. 1 and 2, typical specialty imaging techniques are implemented in document security elements that are restricted to rectangular areas. This is an example of current specialty imaging capabilities which provide static (i.e., non-dynamic) specialty imaging marks with respect to "design" freedom.

In FIG. 1, the rectangular footer provides a logo which incorporates a GlossMark™ text in the right of the rectangular area. Also, microtext lines, another type of a rectangular element, are included as part of the table delineation in FIG. 1.

In FIG. 2, GlossMark™ text is used in the rectangular area at the bottom, a Fluorescent text is used in the rectangular area in the top left, and a microtext line is in the center left portion of a parking permit. These elements are useful in the context of security, but lack aesthetic value.

Examples of conventional specialty imaging techniques are disclosed in U.S. Pat. No. 8,310,718; U.S. Pat. No. 7,324,241; U.S. Pat. No. 7,391,529; Published US Patent Application Number 2007/0139680; Published US Patent Application Number 2007/0139681; Published US Patent Application Number 2009/0207433; Published US Patent Application Number 2009/0262400; Published US Patent Application Number 2010/0214595; Published US Patent Application Number 2010/0238513; Published US Patent Application Number 2011/00127331; Published US Patent Application Number 2011/0191670; Published US Patent Application Number 2011/0205569; Published US Patent Application Number 2012/0140290; co-pending U.S. patent application Ser. No. 13/671,071, filed on Nov. 7, 2012; and co-pending U.S. patent application Ser. No. 13/776,868, filed on Feb. 26, 2013.

The entire content of U.S. Pat. No. 8,310,718 is hereby incorporated by reference. The entire content of U.S. Pat. No. 7,324,241 is hereby incorporated by reference. The entire content of U.S. Pat. No. 7,391,529 is hereby incorporated by reference. The entire content of Published US Patent Application Number 2007/0139680 is hereby incorporated by reference. The entire content of Published US Patent Application Number 2007/0139681 is hereby incorporated by reference. The entire content of Published US Patent Application Number 2009/0207433 is hereby incorporated by reference. The entire content of Published US Patent Application Number 2009/0262400 is hereby incorporated by reference.

The entire content of Published US Patent Application Number 2010/0214595 is hereby incorporated by reference. The entire content of Published US Patent Application Number 2010/0238513 is hereby incorporated by reference. The entire content of Published US Patent Application Number 2011/00127331 is hereby incorporated by reference. The entire content of Published US Patent Application Number 2011/0191670 is hereby incorporated by reference. The entire content of Published US Patent Application Number 2011/0205569 is hereby incorporated by reference. The entire content of Published US Patent Application Number 2012/0140290 is hereby incorporated by reference.

The entire content of co-pending U.S. patent application Ser. No. 13/671,071, filed on Nov. 7, 2012, is hereby incorporated by reference. The entire content of co-pending U.S. patent application Ser. No. 13/776,868, filed on Feb. 26, 2013, is hereby incorporated by reference.

In one conventional specialty imaging technique, the method includes defining a variable portion of the pattern color space in a page description language; defining a fixed portion of the pattern color space in the page description language; defining a bounding shape for the pattern color space in the page description language; and defining a procedure for painting the variable and fixed portions within the bounding shape in the page description language.

In this conventional specialty imaging technique, the variable portion of the pattern color space is based at least in part on variable data associated with the print job and at least one object within the print job identifies the pattern color space for a color parameter.

In another conventional security printing technique, the method includes the use of color shifting ink, which appears as one color from a certain angle and another color from another angle. In other words a special ink is required to realize the color shift effect.

For example, a printed security feature for printed currency utilizes color-shifting ink to print the numerals located in the corners on the front of the bill. More specifically, on a US $100 banknote, the green color use to print the denomination in the corners on the front of the bill will "shift" to grey and back to green as the bill is tilted back and forth to change the viewing angle.

The "optically variable ink" is not widely commercially available and cannot be replicated by any copiers, which only "see" and replicate patterns from a fixed angle.

Therefore, it is desirable to provide a specialty imaging technique, utilizing color-shifting, which does not require special inks or marking materials, and still cannot be readily replicated by conventional copiers and/or scanner.

In addition, it is desirable to provide a specialty imaging technique that is applicable to Variable-Data Intelligent PostScript™ Printware workflows and that transmit an image a single time and subsequently only submit the variable text string to the digital front end.

Furthermore, it is desirable to provide a specialty imaging technique utilizing a see-saw scalable gloss effect.

BRIEF DESCRIPTION OF THE DRAWING

The drawings are only for purposes of illustrating various embodiments and are not to be construed as limiting, wherein:

FIG. 21 shows a portion of a printed image having a hole to allow substrate show through;

DETAILED DESCRIPTION

Figure 1:
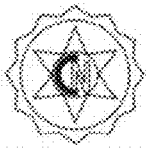
FIG. 1 shows an example of printed material with security elements.
Figure 2:
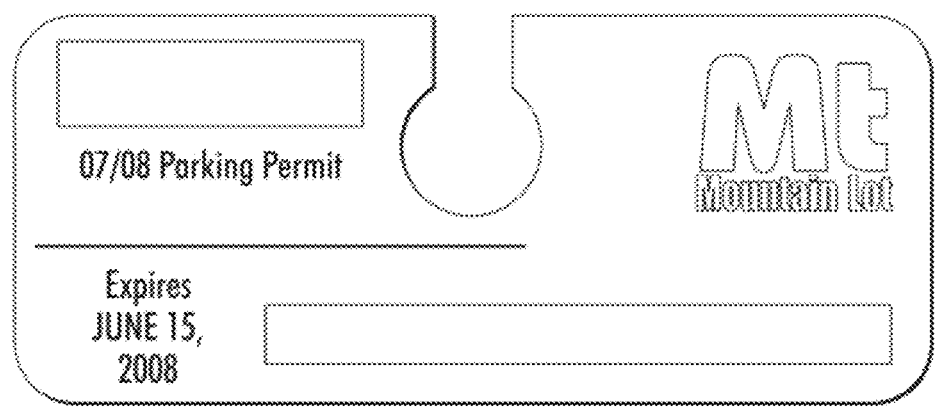
FIG. 2 shows another example of printed material with security elements.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

The term "data" refers herein to physical signals that indicate or include information. An "image," as a pattern of physical light or a collection of data representing said physical light, may include characters, words, and text as well as other features such as graphics.

A "digital image" is by extension an image represented by a collection of digital data. An image may be divided into "segments," each of which is itself an image. A segment of an image may be of any size up to and including the whole image.

The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation performs "image processing" when it operates on an item of data that relates to part of an image.

"Contrast" is used to denote the visual difference between items, data points, and the like. It can be measured as a color difference or as a luminance difference or both.

A digital color printing system is an apparatus arrangement suited to accepting image data and rendering that image data upon a substrate.

The "RGB color model" is an additive color model in which red, green, and blue light are added together in various ways to reproduce a broad array of colors. The name of the model comes from the initials of the three additive primary colors, red, green, and blue.

The main purpose of the RGB color model is for the sensing, representation, and display of images in electronic systems. RGB is a device-dependent color model: different devices detect or reproduce a given RGB value differently, since the color elements and their response to the individual R, G, and B levels vary from manufacturer to manufacturer, or even in the same device over time. Thus, an RGB value does not define the same color across devices without some kind of color management.

The "CMYK color model" is a subtractive color model, used in color printing, and is also used to describe the printing process itself. CMYK refers to the four inks used in some color printing: cyan, magenta, yellow, and black.

"Colorant" refers to one of the fundamental subtractive C, M, Y, K, primaries, which may be realized in formulation as, liquid ink, solid ink, dye, or electrostatographic toner. A "colorant mixture" is a particular combination of C, M, Y, K colorants.

An "infrared mark" is a watermark embedded in the image that has the property of being relatively indecipherable under normal light, and yet decipherable under infrared illumination by appropriate infrared sensing devices, such as infrared cameras.

"Metameric" rendering/printing is the ability to use multiple colorant combinations to render a single visual color, as can be achieved when printing with more than three colorants.

Figure 3:
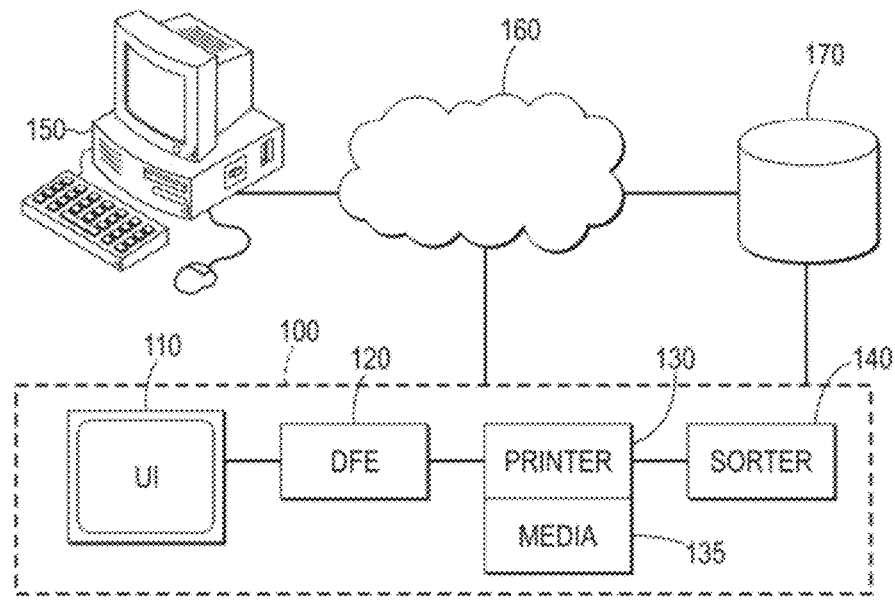
FIG. 3 is block diagram of a printing system suitable for implementing one or more aspects of the exemplary methods described herein.

With reference to FIG. 3, a printing system (or image rendering system) 100 suitable for implementing various aspects of the exemplary embodiments described herein is illustrated.

The word "printer" and the term "printing system" as used herein encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 100 generally includes a user interface 110, a digital front end controller 120, and at least one print engine 130. The print engine 130 has access to print media 135 of various sizes and cost for a print job.

A "print job" or "document" is normally a set of related sheets, usually one or more collated copy sets copied from a set of original print job sheets or electronic document page images, from a particular user, or otherwise related. For submission of a regular print job (or customer job), digital data is generally sent to the printing system 100.

A sorter 140 operates after a job is printed by the print engine 130 to manage arrangement of the hard copy output, including cutting functions. A user can access and operate the printing system 100 using the user interface 110 or via a workstation 150. The workstation 150 communicates with the printing system 100 via a communications network 160.

A user profile, a work product for printing, a media library, and various print job parameters can be stored in a database or memory 170 accessible by the workstation 150 or the printing system 100 via the network 160, or such data can be directly accessed via the printing system 100. One or more color sensors (not shown) may be embedded in the printer paper path, as known in the art.

Figure 4:
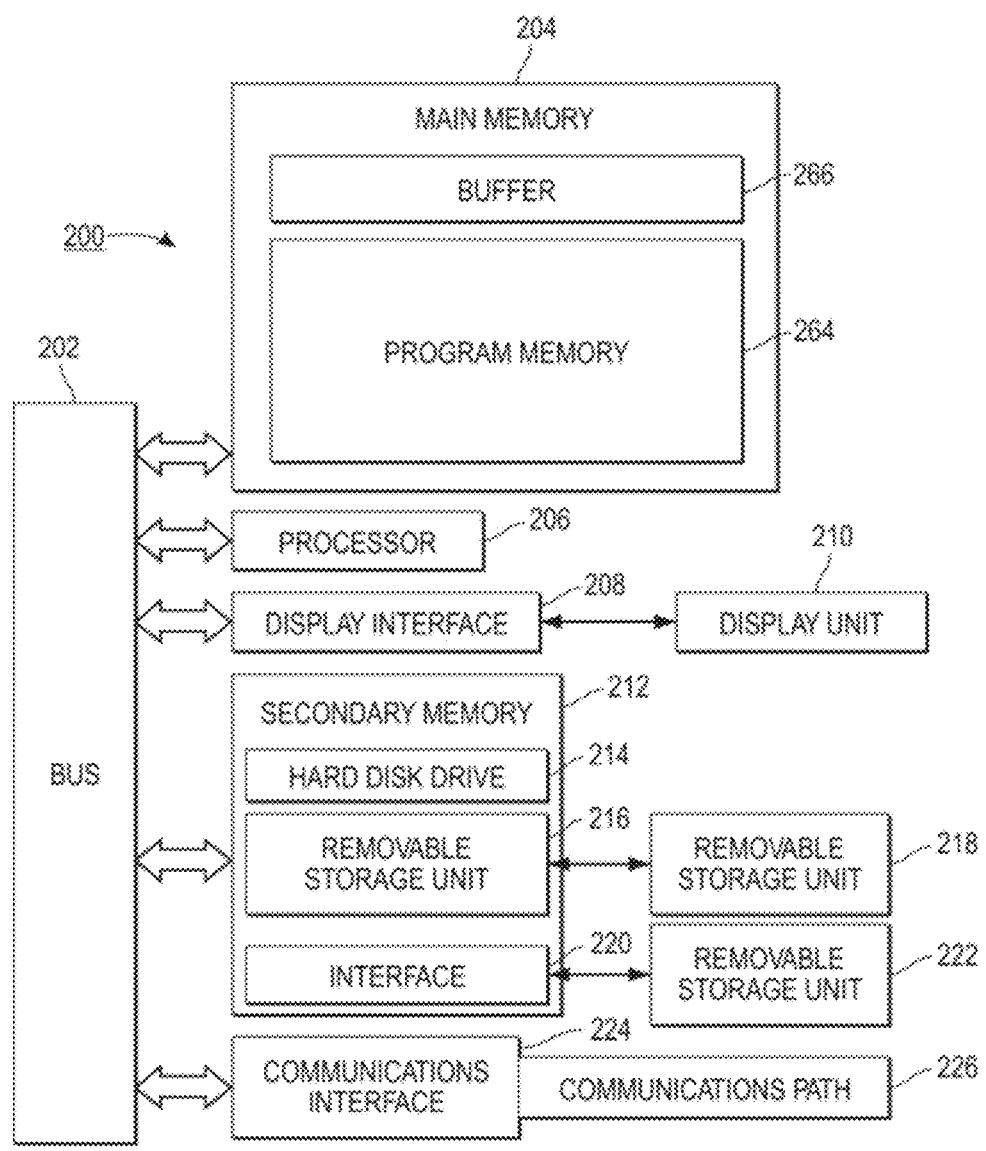
FIG. 4 is a block diagram of a digital front end controller useful for implementing one or more aspects of the exemplary methods described herein.

With respect to FIG. 4, an exemplary digital front end controller 200 is shown in greater detail. The digital front end 200 includes one or more processors, such as processor 206 capable of executing machine executable program instructions.

In the embodiment shown, the processor is in communication with a bus 202 (e.g., a backplane interface bus, cross-over bar, or data network). The digital front end 200 also includes a main memory 204 that is used to store machine readable instructions. The main memory also being capable of storing data. Main memory may alternatively include random access memory (RAM) to support reprogramming and flexible data storage. Buffer 266 is used to temporarily store data for access by the processor.

Program memory 264 includes, for example, executable programs that implement the embodiments of the methods described herein. The program memory 264 stores at least a subset of the data contained in the buffer.

The digital front end 200 includes a display interface 208 that forwards data from communication bus 202 (or from a frame buffer not shown) to a display 210. The digital front end 200 also includes a secondary memory 212 includes, for example, a hard disk drive 214 and/or a removable storage drive 216, which reads and writes to removable storage 218, such as a floppy disk, magnetic tape, optical disk, etc., that stores computer software and/or data.

The secondary memory 212 alternatively includes other similar mechanisms for allowing computer programs or other instructions to be loaded into the computer system. Such mechanisms include, for example, a removable storage unit 222 adapted to exchange data through interface 220. Examples of such mechanisms include a program cartridge and cartridge interface (such as that found in video game devices), a removable memory chip (such as an EPROM, or PROM) and associated socket, and other removable units and interfaces which allow software and data to be transferred.

The digital front end 200 includes a communications interface 224, which acts as both an input and an output to allow software and data to be transferred between the digital front end 200 and external devices. Examples of a communications interface include a modem, a network interface (such as an Ethernet card), a communications port, a PCMCIA slot and card, etc.

Computer programs (also called computer control logic) may be stored in main memory 204 and/or secondary memory 212. Computer programs may also be received via a communications interface 224. Such computer programs, when executed, enable the computer system to perform the features and capabilities provided herein. Software and data transferred via the communications interface can be in the form of signals which may be, for example, electronic, electromagnetic, optical, or other signals capable of being received by a communications interface.

These signals are provided to a communications interface via a communications path (i.e., channel) which carries signals and may be implemented using wire, cable, fiber optic, phone line, cellular link, RF, or other communications channels.

Part of the data generally stored in secondary memory 212 for access during digital front end operation is a set of translation tables that convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables are commonly created outside of the digital front end and downloaded, but are optionally created inside the digital front end in a so-called characterization step.

In the some of the descriptions below, specialty imaging elements are used in a dynamic pattern generation process to provide security features.

For example, a specialty imaging technique, as illustrated in FIGS. 5-8, create a pattern color space that incorporates specialty imaging features using standard page description language constructs, such as PostScript™ constructs. The pattern color space can be selected as a color for a color parameter for an object (e.g., lines, text, geometric shapes, freeform shapes, etc.) or an object characteristic (e.g., line color, fill color, foreground color, background color, etc.) in the document.

Specialty imaging techniques can be implemented by creating a specialty image object. Alternatively, specialty imaging techniques can be implemented using page description language constructs, such as PostScript™ constructs, to create a pattern color space, sometimes referred to as a "pattern ink." In other words, within page description languages, specialty imaging text and specialty imaging pattern inks can be implemented.

Rather than defining the specific string to be rendered at a specified location on the page, a specialty imaging string may be used to define a dynamically created pattern ink. This pattern ink is subsequently accessible by other page description language drawing and rendering commands through selection as a color parameter in the command.

Figure 5:
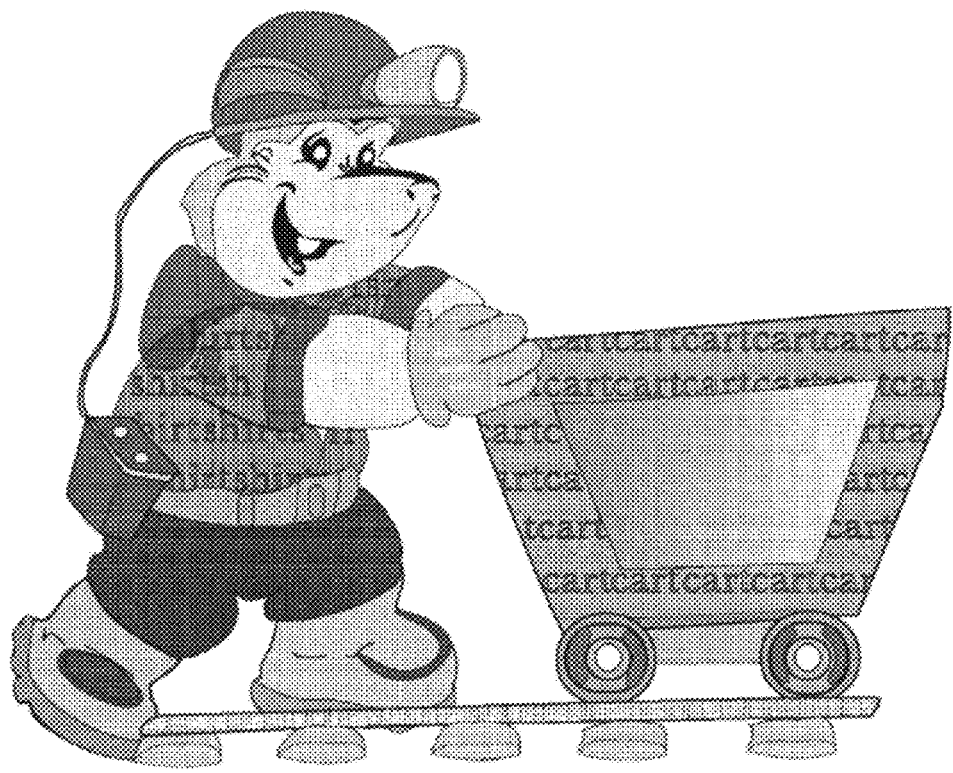
FIG. 5 shows an exemplary embodiment of a graphic image with certain objects printed with a pattern color space created using variable data.

With reference to FIG. 5, an exemplary graphic illustrates an exemplary embodiment of a process for dynamic creation of pattern inks. Through specialty imaging, the shirt, as well as the cart and the rails, can be changed into security elements on a variable data basis.

In this example, a "tile" of GlossMark™ text is defined as a pattern ink. This pattern ink can be previously designed with static characteristics. Alternatively, the pattern ink may be dynamically designed in conjunction with the processing of a corresponding print job. Both previously and dynamically-designed pattern inks can also incorporate variable data associated with the print job, as illustrated by the string "shirt" for the shirt (see FIG. 7) and "cart" for the cart (see FIG. 8). Additionally, the rails are rendered using a microtext string (see FIG. 8).

An exemplary embodiment of a pattern ink that includes a specialty imaging GlossMark™ test effect for the string "XEROX!"™ may be created using the following exemplary PostSript™ pseudo-code:

TABLE-US-00001

```
/GlossFont /NeueClassic-GL-24 def
/GlossFontsize 28.8 def
/GlossFontstring (XEROX!) def
%% this sets the Font parameters.
    /PatternType 1
%% tiling properties can be defined similar to Holladay dots
    /BBox [0 0 GlossFontstring stringwidth pop GlossFontsize]
    /XStep GlossFontstring stringwidth pop
    /YStep smallfontsize
%% geometric values for the tiling rectangle
    /PaintProc { 0 0 moveto GlossFontstring show
    }
%% this creates the variable data string defined through GlossFontstring
matrix makepattern
```

TABLE-US-00001-continued

```
/GlossTextPaint exch def
%% identifying the patterns as GlossTextPaint
```

Figure 6:
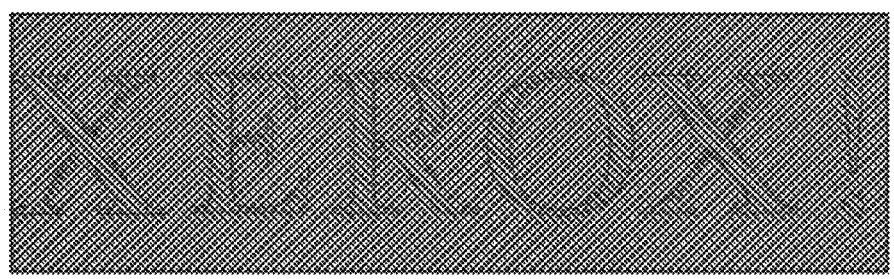
FIG. 6 shows an exemplary embodiment of a pattern color space created using variable data.

FIG. 6 shows the exemplary pattern ink (or pattern color space) created by the PostSript™ pseudo-code listed above. The string "XEROX!"™ can be traced as the texture change of the halftone for this pattern ink. In this example, the pattern color space of FIG. 6 is available as a "color" or "ink" selection for subsequent PostScript™ drawing commands.

Note that the geometry and size of the pattern in FIG. 6 may be characterized as a fixed portion of the pattern ink. In the example above, the geometry and size of the pattern is created in the first step of the pseudo code.

In one embodiment, a pattern ink (or pattern color space) used for tiling is defined with respect to an origin of a page (i.e., the pattern ink is available for all objects on the page, except for image objects) and not with respect to a specific object.

For example, this means that the GlossMark™ text inside the shirt may start with the letter "X" or any other letter of the string depending on the location of the object in relation to the page. In other words, two identical shirts, drawn at different locations on the page may have different internal GlossMark™ patterns, since their starting position varies.

Figure 7:
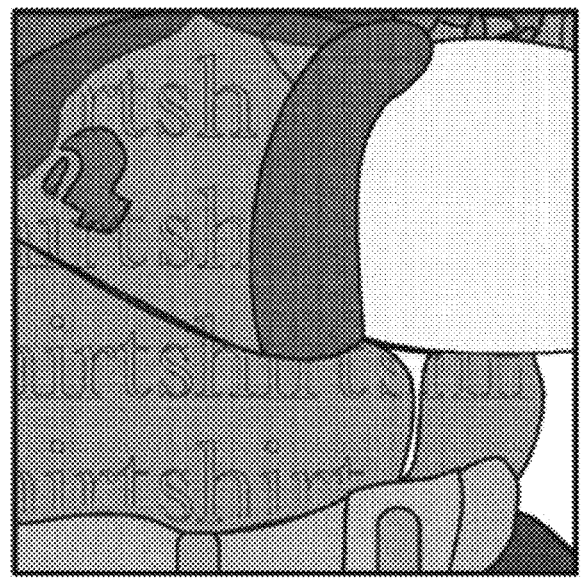
FIG. 7 shows a portion of the graphic image of FIG. 5 with an object filled with the pattern color space of FIG. 6.

With reference to FIG. 7, the pattern ink of FIG. 6 is used as the fill color for the shirt of FIG. 5 using the word "shirt" as the variable data string (rather than "Xerox!")™. In other words, the word "shirt" is used as GlossMark™ text to create the pattern ink used to render the shirt area of FIG. 5. The word "shirt" is tiled with respect to other occurrences of the word which is based on the tile size for the pattern ink.

Figure 8:
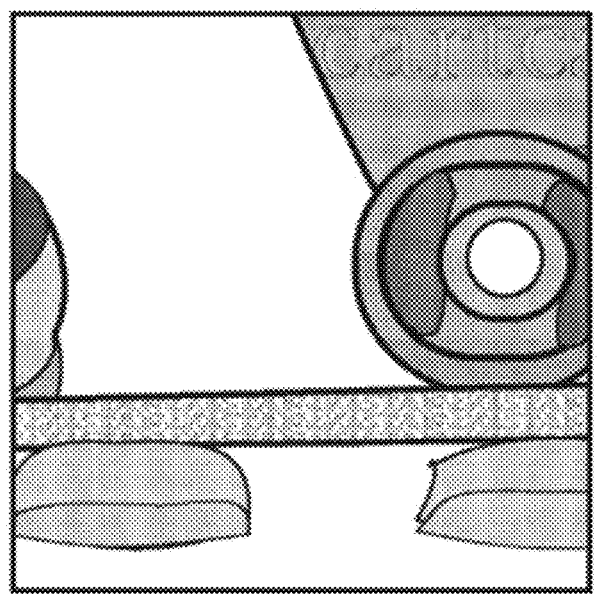
FIG. 8 shows another portion of the graphic image of FIG. 5 with another object filled with another exemplary embodiment of a pattern color space using variable data.

Multiple pattern inks can be defined. For example, a pattern consisting of lines of microtext may be defined and used to render the rails at the bottom of the graphic. FIG. 8 provides an enlargement of a small area of the rails to show this pattern ink with microtext.

As previously noted, specialty imaging techniques may be text based, wherein text is any symbol that is encapsulated as font, or image based. In the conventional specialty imaging techniques, the text based specialty imaging techniques can be realized in real-time, whereas the image-based conventional specialty imaging techniques are performed as an offline process, eliminating any real-time capabilities, because of the computational requirement for images that cannot easily be done inside a Postscript™ dataflow through a digital front end.

In the conventional specialty imaging techniques, pattern inks in page description languages; such as PostScript™ and PDF (Portable Document Format); are typically used for repeating patterns, essentially, the pattern inks correspond to tiles that are regularly laid across the page.

In a typical situation, each pattern ink is a rectangular area that is repeated in both x-direction and y-direction across the page. Subsequent PostScript™ commands 'expose' that pattern to the printed page in the desired spots, where the phasing of the pattern ink is constant with respect to the original definition.

For example, by defining two pattern inks that have the same average visual color (say in Lab space) but very distinct toner combinations, variable data (text-based) UV fluorescence specialty imaging can be realized.

In this example, the background is 'painted' with one of the pattern inks and the foreground with the other, resulting in a distinct UV fluorescence. In essence, the components of the specialty imaging effect are loaded into distinct pattern inks and subsequently selectively 'paint' with these two components.

For an image-based real-time specialty imaging technique, the approach described above needs to be inverted. In other words, the image is loaded into the pattern ink memory. This leads to a single pattern ink.

More specifically, the image based real-time specialty imaging technique uses a specialty imaging font (such as a GlossMark™ font or CorrelationMark™ font) in conjunction with the variable data string and uses the image as the "paint" that is poured through the specialty imaging font.

It is noted that the various features of the process disclosed herein may be implemented using hardware, software, or firmware in any suitable combination.

The image based real-time specialty imaging technique process for processing a print job begins when the print job, including variable data to be used in conjunction therewith, in a page description language is received at a digital front end associated with a printing system. At least one object within the print job includes a specialty imaging font (such as a GlossMark™ font or CorrelationMark™ font) that provides fraud protection for printed materials resulting from the print job.

A pattern color space is created using the actual image of the print job so that such that the specialty imaging font (such as a GlossMark™ font or CorrelationMark™ font) is painted with the pattern color space in a tiling manner. In other words, a data string is created using the specialty imaging font (such as a GlossMark™ font or CorrelationMark™ font) and the specialty imaging font data string is painted with the actual image of the print job.

The image based real-time specialty imaging technique process for processing a print job creates a GlossMark™ or CorrelationMark™, in real-time, by: defining, in the page description language, a variable portion; defining, in the page description language, a fixed portion of the pattern color space.

The fixed portion is the image of the print job; defining, in the page description language, a bounding shape for the pattern color space; and defining, in the page description language, a procedure for painting the variable and fixed portions within the bounding shape, with the image of the print job. The variable portion may be based in part on variable data associated with the print job. The fixed portion ("paint") is the image of the print job.

The variable data string that is created using the specialty imaging font (such as a GlossMark™ font or CorrelationMark™ font) is painted with the image of the print job, wherein specialty imaging effects in the specialty imaging font is used to create the GlossMark™ or CorrelationMark™, with the image being used as the paint, instead of using two different pattern inks to create the GlossMark™ or CorrelationMark™.

In implementing the image based real-time specialty imaging technique and creating a variable data string, the process does not know, in advance, what the string is going to be used. Additionally, if the size of the font (in pixels) is compared with the size of the image, the selected image is not typically exactly N-lines high and M-characters wide.

Figure 9:
FIG. 9 is an exemplary embodiment of a process for creating a pattern color space for use in conjunction with processing a print job.

In order to circumvent this situation, a single pattern ink cell white space is created on the top and side of the pattern cell, as illustrated in FIG. 9. Preferably, the single pattern ink cell white space is created only once and is placed in a pattern cache for performance.

It is noted that it is not important on which sides the white space is created as long as it is created in both the vertical and horizontal direction since the "pattern" of FIG. 9 is tiled across the entire page, and thus, the white space will be all around the image.

The required size of the white space can be calculated from the specialty imaging font's properties. With respect to the vertical direction (320 of FIG. 9) the line-height of the specialty imaging font is utilized as the height 320 of the white space. Through the tiling, the image based real-time specialty imaging technique will create a full line of white space above and below the image.

When writing the variable data string with the effect, the ceiling {imageheight/lineheight} is the number of lines of variable data text. If the variable data text string does not extend across this range, the image based real-time specialty imaging technique can (a) fill the remainder with a blank " " character or preferably (b) replicate the string.

The horizontal white space (310) can be determined by two different scenarios.

In the first scenario, the image based real-time specialty imaging technique deals with strings that physically fit into image size. An upper bound to the white space would be the image width parameter.

It is noted that the upper bound could be extended by the known string length limitations [variable data field length association].

In a second scenario, the image based real-time specialty imaging technique adds additional white space to the side of the image (essentially the remainder of the page). This is utilized when the expected string is completely unknown.

Once the pattern ink (FIG. 9) is created, the pattern ink is now used as a "paintbrush" to actually render the variable data text. In contrast to all previous specialty imaging approaches, the image based real-time specialty imaging technique uses the specialty imaging effect embedded in the delivered fonts and use the pattern ink (FIG. 9) as the "constant" part of the method.

An exemplary embodiment of specialty imaging effects in the specialty imaging font being used to create the GlossMark™ or CorrelationMark™, with the image being used as the paint, may be created using the following exemplary PostSript™ Pseudo-Code:

```
% creates a pattern ink from an image and whitespace
% xpix ypix = pixels lines of image
% xsize ysize = size of image
% xmargin ymargin = white space
<<
    /PatternType 1
    /PaintType 1
    /TilingType 1
    /BBox [xmargin ymargin xsize xmargin add xgap add ysize ymargin
    add ygap add]
    /XStep xsize xgap add
    /YStep ysize ygap add
    /PaintProc
    {
        [xsize 0 0 ysize xmargin ymargin] concat
        /ImageDict 8 dict def
        ImageDict begin
            /ImageType 1 def
            /Width x def
            /Height y def
            /BitsPerComponent 8 def
```

-continued

```
        /ImageMatrix [xpix 0 0 -ypix 0 ypix] def
        /DataSource imgFile def
        /Decode [ 0 1 0 1 0 1 ] def
      end
      COLORSPACE setcolorspace
      ImageDict image
      imgFile resetfile
    }
>>
matrix
makepattern setpattern
% fs = font height
/lines ysize fs div ceiling cvi def
/NeueSecurity-Bold-CR-36 fs selectfont
% write enough lines to create entire image
lines
{
   x y fs DEC mul sub moveto
   str show
   /y y fs add def
} repeat
```

Figure 10:
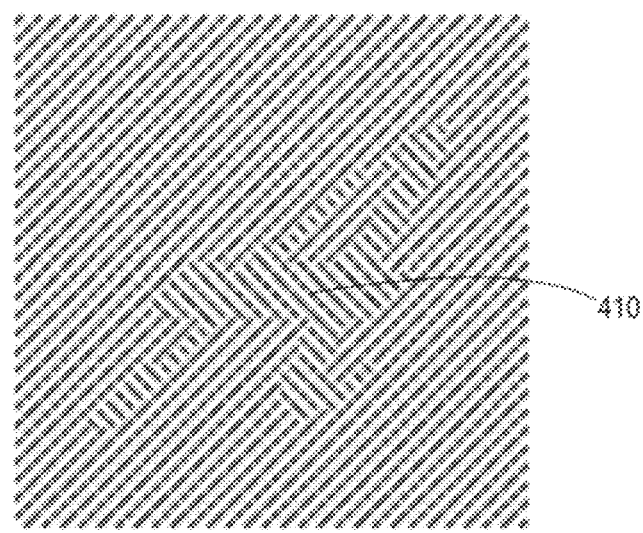
FIG. 10 shows a 'typical' GlossMark™ font element.

Variable or personalized data is then written using the pattern ink using CorrelationMark™ or GlossMark™ fonts. FIG. 10 shows a 'typical' GlossMark™ font element (in this case the letter "A" (410)).

Figure 11:
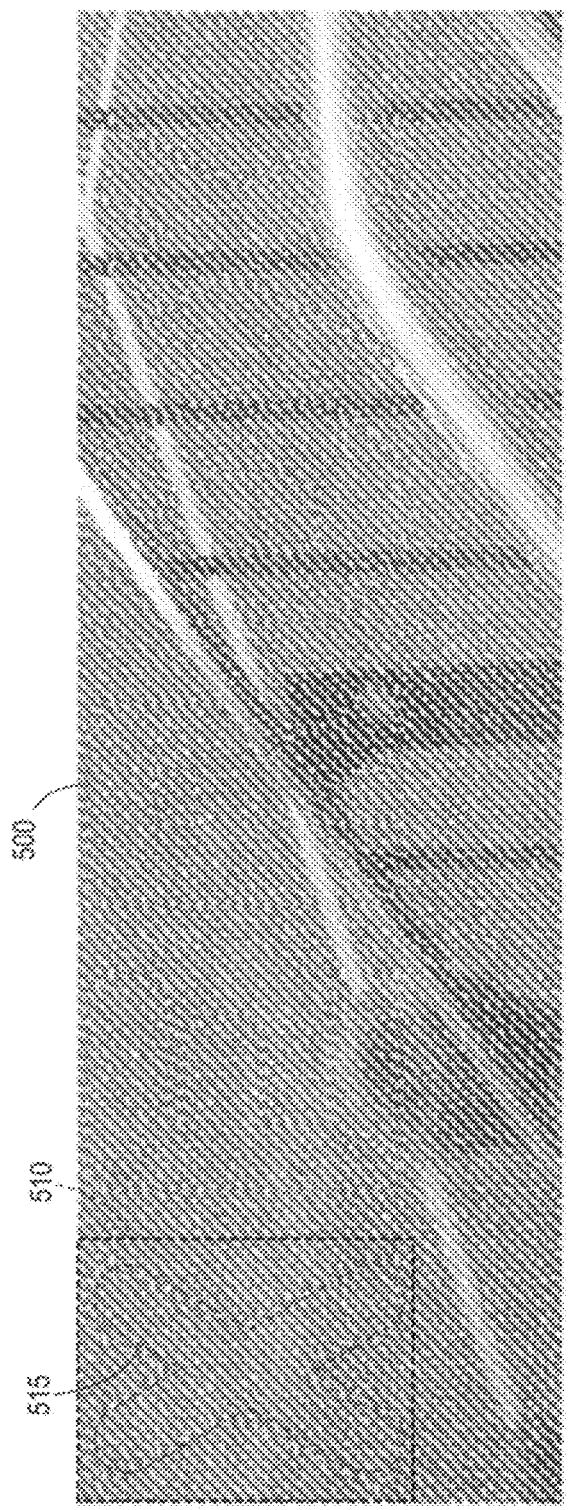
FIG. 11 shows an example of a CorrleationMark™ string.
Figure 12:
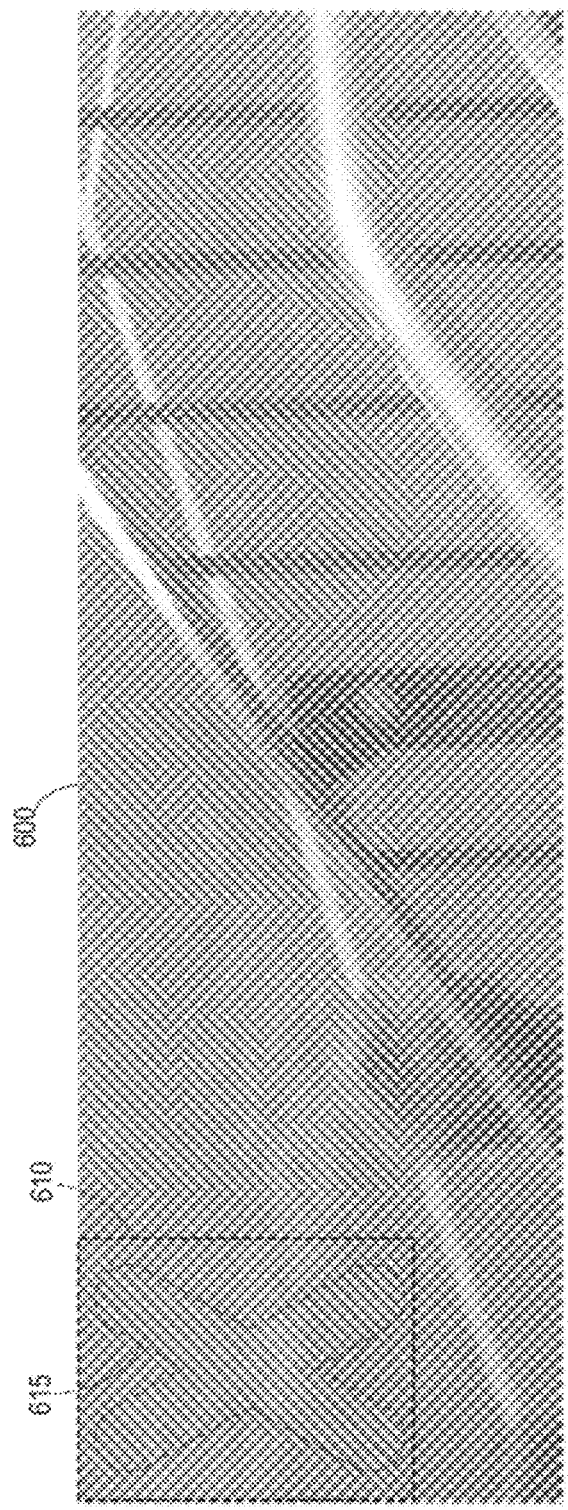
FIG. 12 shows an example of a GlossMark™ string.

FIGS. 11 and 12 show magnified portions (500 and 600) of a CorrleationMark™ and GlossMark™ string (XEROX)™, respectively, printed using the same image as the pattern ink (FIG. 9). The internal structure, that the specialty imaging effect and the text have maintained, is clearly visible.

More specifically, in FIG. 11, the dotted box 510 encloses the letter X (which has been traced 515) of the Corrleation-Mark™ string (XEROX)™. In addition, in FIG. 12, the dotted box 610 encloses the letter X (which has been traced 615) of the GlossMark™ string (XEROX)™.

It is noted, from FIGS. 11 and 12, that the available dynamic range of the image is lost since all areas have maintained a certain percentage of "white space" for the specialty imaging effect.

Moreover, it is noted that the images turn lighter' than the image would have been printed in the normal path due to the additional white space. However, the darkness adjustment can be performed in an offline step. In addition, the darkness can be approximately adjustment by using a simple data scale inside the PostScript™ data.

An example of providing specialty marks is the use of color shifting ink, which appears as one color from a certain angle and another color from another angle. Conventionally, color shifting required a special ink or marking material.

To avoid the use of special inks or marking materials, the color shifting result may be realized by creating a pattern of two different colors, wherein each color has a different height and at least one of the colors is created with a very thin line; for example, one pixel width line.

Figure 13:
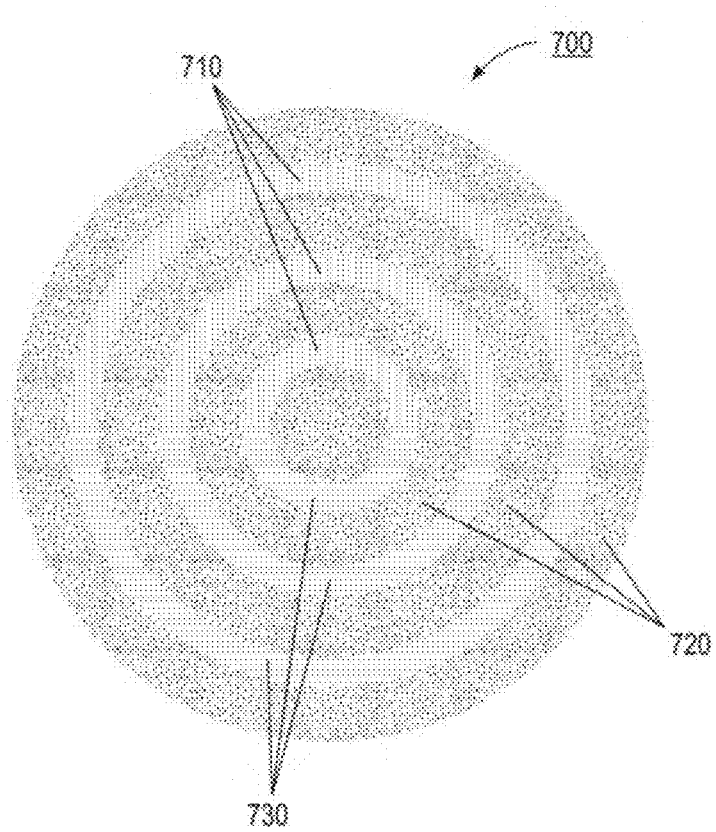
FIG. 13 shows an example of a color shift ink image using non-special inks or marking materials.

It is noted, as illustrated in FIG. 13, that there is color shift with 710/720 and 730/720, but not if just 710/730. The intersection of 710/730 creates the distinct line which virtually disappears when shifting.

For example, as illustrated in FIG. 13, a color shifting image 700 can be created using two colors 710 and 730. Each of the colors 710 and 730 has a marking material height, H1. The color shifting image 700 further includes a third color 720 which has a marking material height, H2, wherein the marking material height, H2, is greater than the marking material height, H1.

In one example, the two colors 710 and 730 may be cyan (C) and magenta (M), while the third color 720 may be a composite black such that the color 720 is composed of 100% black (K) and 50% of cyan (C), magenta (M), and yellow (Y). The composite black (third color 720) would have marking material height, H2, which is 2.5 times greater than the marking material height, H1.

It is noted that in the example of FIG. 13, the high color black 720 is wider than the low colors 710 and 730 (cyan and magenta). The smallest magenta or cyan square may be one pixel.

It is further noted that the reverse, where the low color is wider than the high color does not result in a color shift.

It is noted that the color shift may go from black and magenta to black, whereas conventional US currency goes from gold to green.

It is also noted that the low color may be created using a single color component marking material; a single color marking material may be cyan colored marking material (toner), magenta colored marking material (toner), or yellow colored marking material (toner). When the low color is created using a single color component marking material, the background of the color shifting region may be initially rendered with the single color component marking material associated with the low color. Thereafter, the high color can be rendered, in the color shifting region, over the rendered background so as to create the marking material height difference between the low color and the high color.

If the low color is created using more than one single color component marking material, the background of the color shifting region may be initially rendered with the single color component marking materials associated with the low color. Thereafter, the high color can be rendered, in the color shifting region, over the rendered background so as to create the marking material height difference between the low color and the high color.

As noted above, in the area of security printing, documents are protected from copying, forging, and counterfeiting using multiple techniques. Specialty Imaging is one such method of security printing which uses standard materials, such as papers, inks, and/or toners.

MicroGloss (or Artistic Black for VIPP) is a Specialty Imaging technique, which does not require a special tool; e.g., UV light to view and is especially strong in anti-copying.

MicroGloss uses a pair of colors which appear about the same when viewing straight on but show a differential gloss when the image is tilted due to the pile height of the toner or ink.

MicroGloss can also be used to create two micro gloss layers such that only the first micro gloss layer is visible when viewing the image straight on, and the second micro gloss layer is viewable upon tilting the image. It is noted that upon tilting the image the first micro gloss layer is no longer visible.

To create a two layered micro gloss image, one pattern ink with a MicroGloss color pair and variable data is created, and then a second pattern ink with a visibly different MicroGloss color pair but the same variable data is created.

The background of the image is written with the first pattern ink followed by the second layer with the second pattern ink and different variable data.

Figure 14:
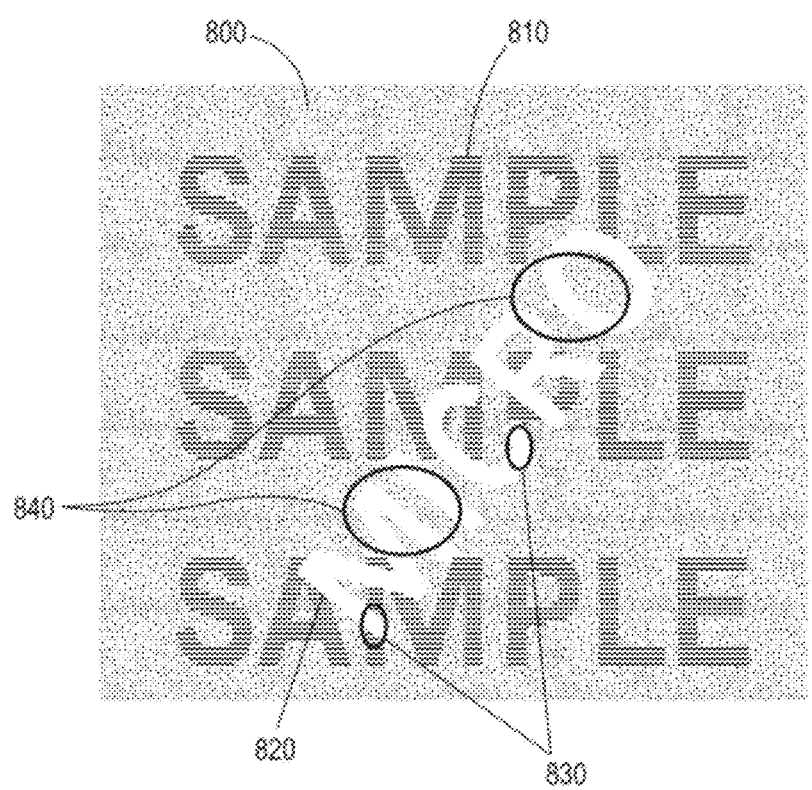
FIG. 14 shows an example of a double layer micro gloss image.

As illustrated in FIG. 14, the first ink pattern may be composed Color1-High 800 (such as black hi) and Color1-Low 810 (such as black low) with variable data "SAMPLE."

As illustrated in FIG. 14, the second ink pattern may be composed of Color2-High (such as brown high) and Color2-

Low (such as brown low) with variable data "SAMPLE." The second ink pattern is used to paint variable data "MICRO."

Upon rendering this image, the variable data "SAMPLE" is rendered in Color1-Low 810 and the background is rendered in Color1-High 800; however, where the portions of the variable data "MICRO" overlap the variable data "SAMPLE," the overlapping portions (within ovals 830) are rendered with Color2-Low, and where the portions of the variable data "MICRO" overlap the background, the overlapping portions (within ovals 840) are rendered with Color2-Hi.

In the example discussed above, the rendered image would include a black hi background with black low "SAMPLE." The rendered image would also include brown low portions (within ovals 830) where portions of the variable data "MICRO" overlap the variable data "SAMPLE," and brown hi portions (within ovals 840) where the portions of the variable data "MICRO" overlap the background.

It is noted that hi/low color pair may be dark red or any of the hi/low color pairs identified in co-pending U.S. patent application Ser. No. 13/776,868, filed on Feb. 26, 2013. The entire content of co-pending U.S. patent application Ser. No. 13/776,868 is hereby incorporated by reference.

It is also noted that gloss marks are not scalable because gloss marks require a new font for each font size. Moreover, MicroGloss only works at small sizes.

Thus, it is desirable to realize a scalable gloss effect.

Such a scalable gloss effect can be realized by rendering one region with a relatively smooth surface while rendering another region with a relatively rougher surface. The appearances of the two surfaces are approximately the same at one angle, while giving a gloss effect; e.g., text or graphics; at another angle.

Figure 15:
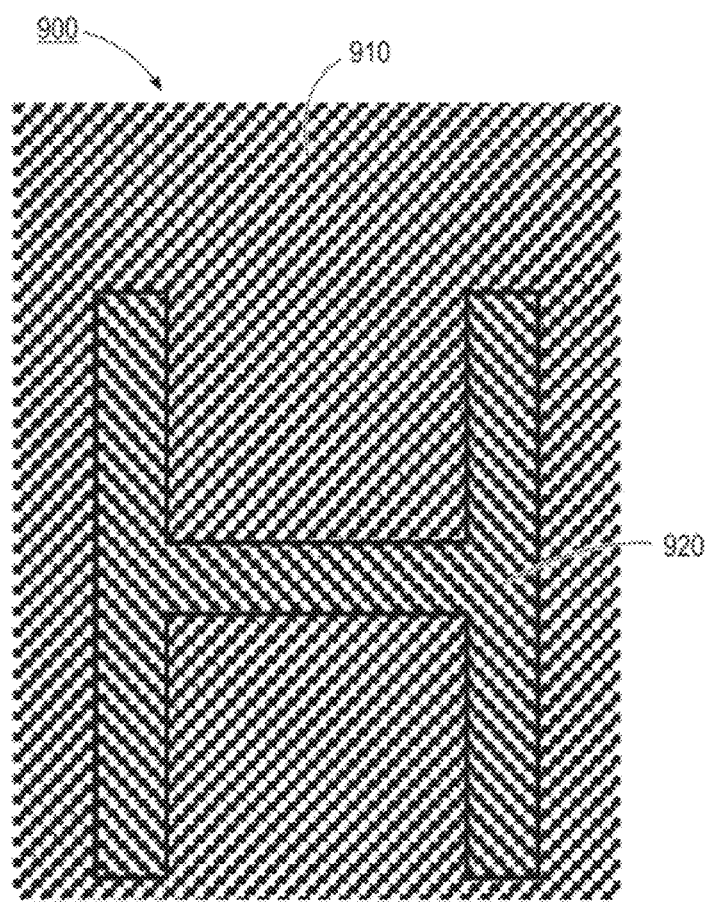
FIG. 15 shows an example of a gloss mark.

Gloss marks, as shown in FIG. 15, create a gloss effect by using two different halftone patterns 910 and 920. As illustrated in FIG. 15, the background is rendered using a first halftone pattern 910 and the letter H is rendered using a second halftone pattern 920. To a casual observer, the image 900 will appear as one color and pattern at one angle, while the character "H" can be seen when tilted. In other words, the H appears to the causal observer as being drawn into the image when the image is tilted.

Figure 16:
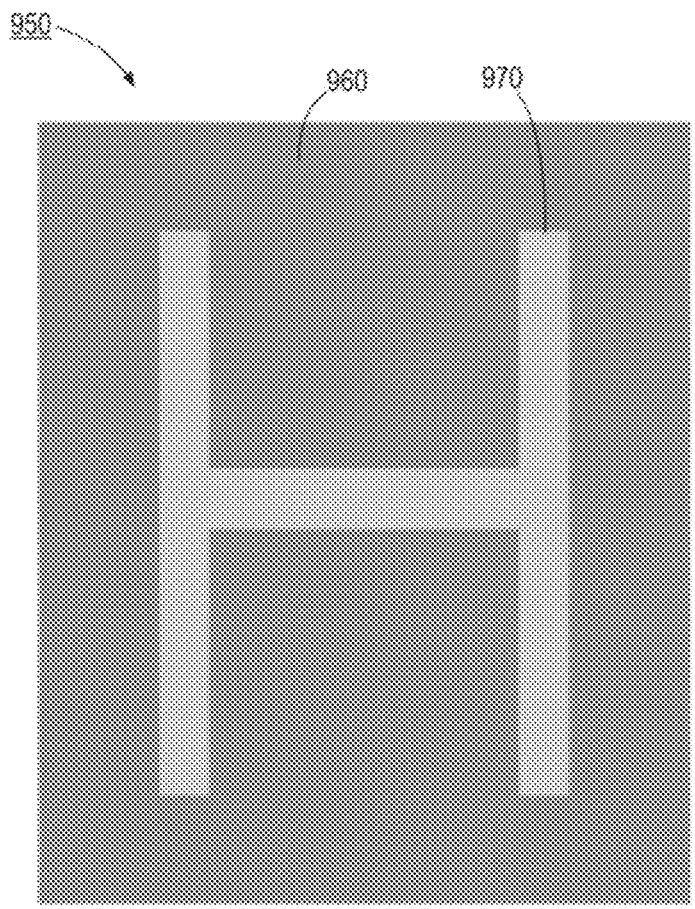
FIG. 16 shows an example of a micro gloss mark.

MicroGloss, as illustrated in FIG. 16, creates a gloss effect by using two different ink or toner pile heights. To a casual observer the image 950 will appear as one color 960 at one angle, while the gloss character 970 can be seen when tilted.

Figure 17:
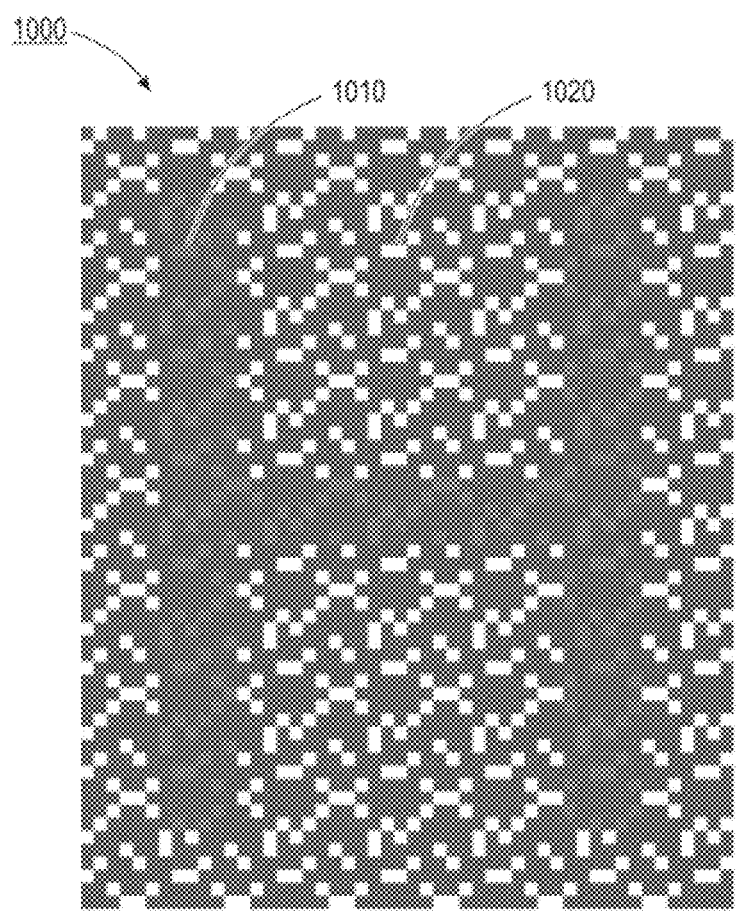
FIG. 17 shows an example of the gloss effect when using two different patterns with one relatively smoother than the other.

As illustrated in FIG. 17, a gloss effect is created by using two different patterns with one pattern being relatively smoother than the other pattern. In FIG. 17, the "H" is smoother as compared to the background.

In addition, as illustrated in FIG. 17, the "H" has yellow color holes (1010) and compared to no color (white) holes (1020) in the background. It is noted that clear toner would be used in place of yellow if available.

To a casual observer the image 1000 will appear as one color and pattern at one angle, while the character "H" can be seen when tilted. It is noted that this gloss effect is scalable.

To create the gloss effect of FIG. 17, one pattern ink is created with white holes and a second pattern ink is created with yellow holes. Thereafter, a text box is created with a certain background color (such as magenta) and white holes (1020) are added. The letter, "H," is then written and yellow dots (1010) are added.

Figure 18:
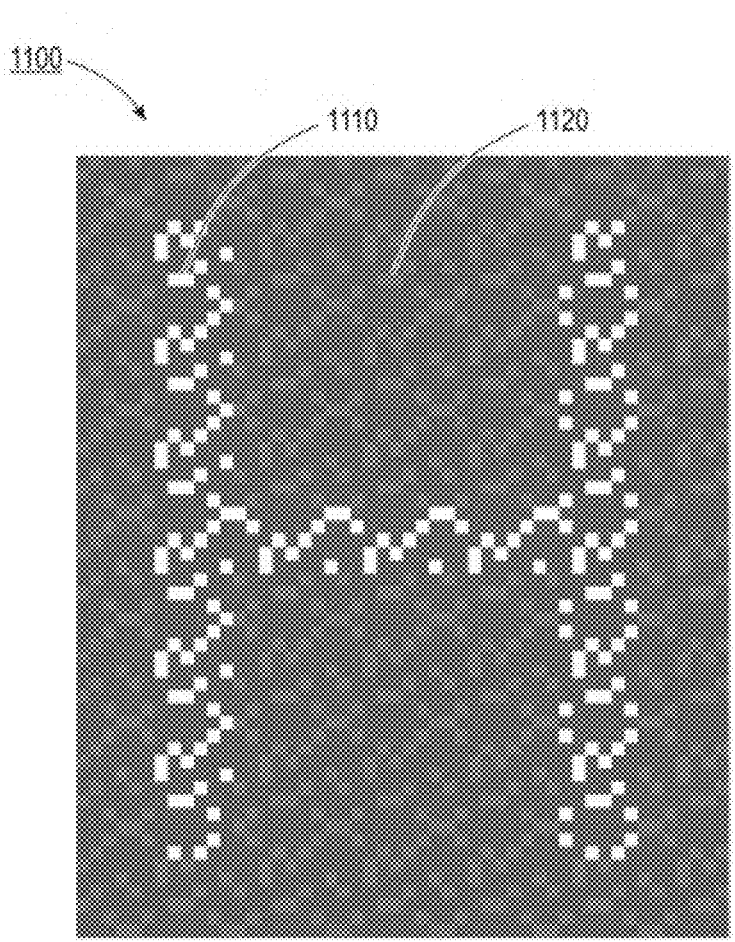
FIG. 18 shows an example of the reverse gloss effect of FIG. 17.

As illustrated in FIG. 18, a reverse gloss effect is created by using two different patterns with one pattern being relatively smoother than the other pattern. In FIG. 18, the background is smoother as compared to the "H."

In addition, as illustrated in FIG. 18, the "H" has white color holes (1110) and compared to yellow holes (1120) in the background. It is noted that clear toner would be used in place of yellow if available.

To create the gloss effect of FIG. 18, one pattern ink is created with white holes and a second pattern ink is created with yellow holes. Thereafter, a text box is created with a certain background color (such as magenta) and yellow holes (1220) are added. The letter, "H," is then written and white dots (1110) are added.

Figure 19:
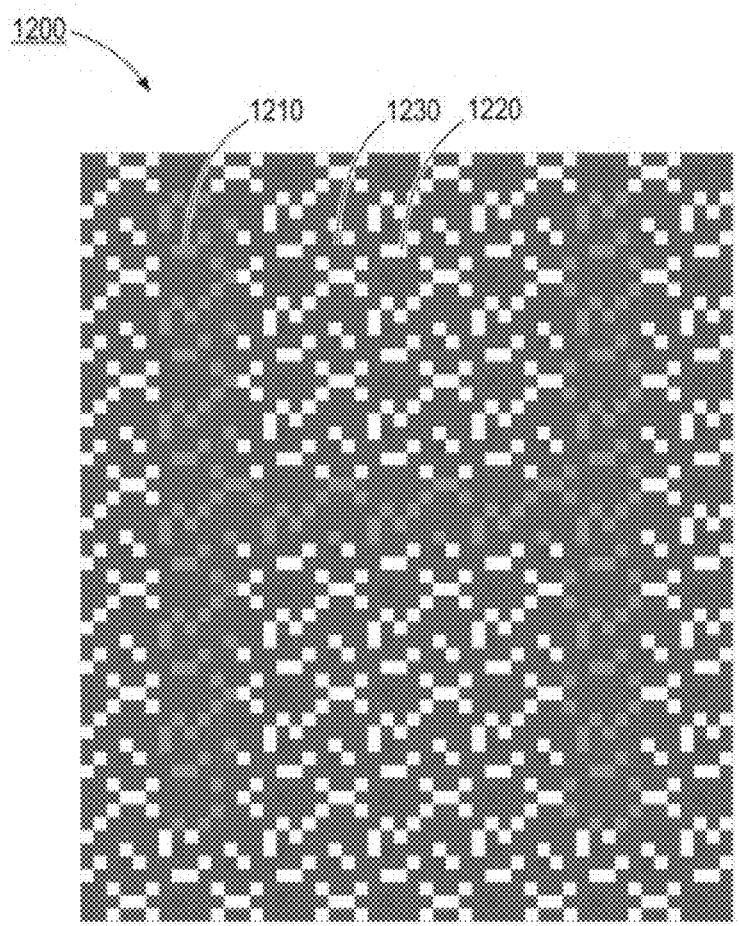
FIG. 19 shows the example of FIG. 17 with the addition of darker pixels.

It is noted that a better color match can be realized by adding darker pixels 1230, as illustrated in FIG. 19. In FIG. 19, the "H" has yellow color holes (1210) and compared to no color (white) holes (1220) in the background, as well as, darker pixels 1230 in the background.

Specialty Imaging techniques often rely on creating metameric pattern ink pairs such as UV(ultraviolet)/florescence and IR (infrared). The scalable gloss effect, described above, used a pair of pattern inks that appear about the same at one angle and show a differential gloss effect when tilted.

It is noted that Specialty Imaging quality is judged on the strength of the effect; e.g., UV signal and the hiding between the foreground and background pattern inks. In other words, the test is whether the signal (pattern) that is seen under UV illumination can be seen under ambient illumination. Conventionally, distraction patterns, color compensation, and/or noise have been used to help in hiding, but at the cost of effect (signal) degradation.

Figure 20:
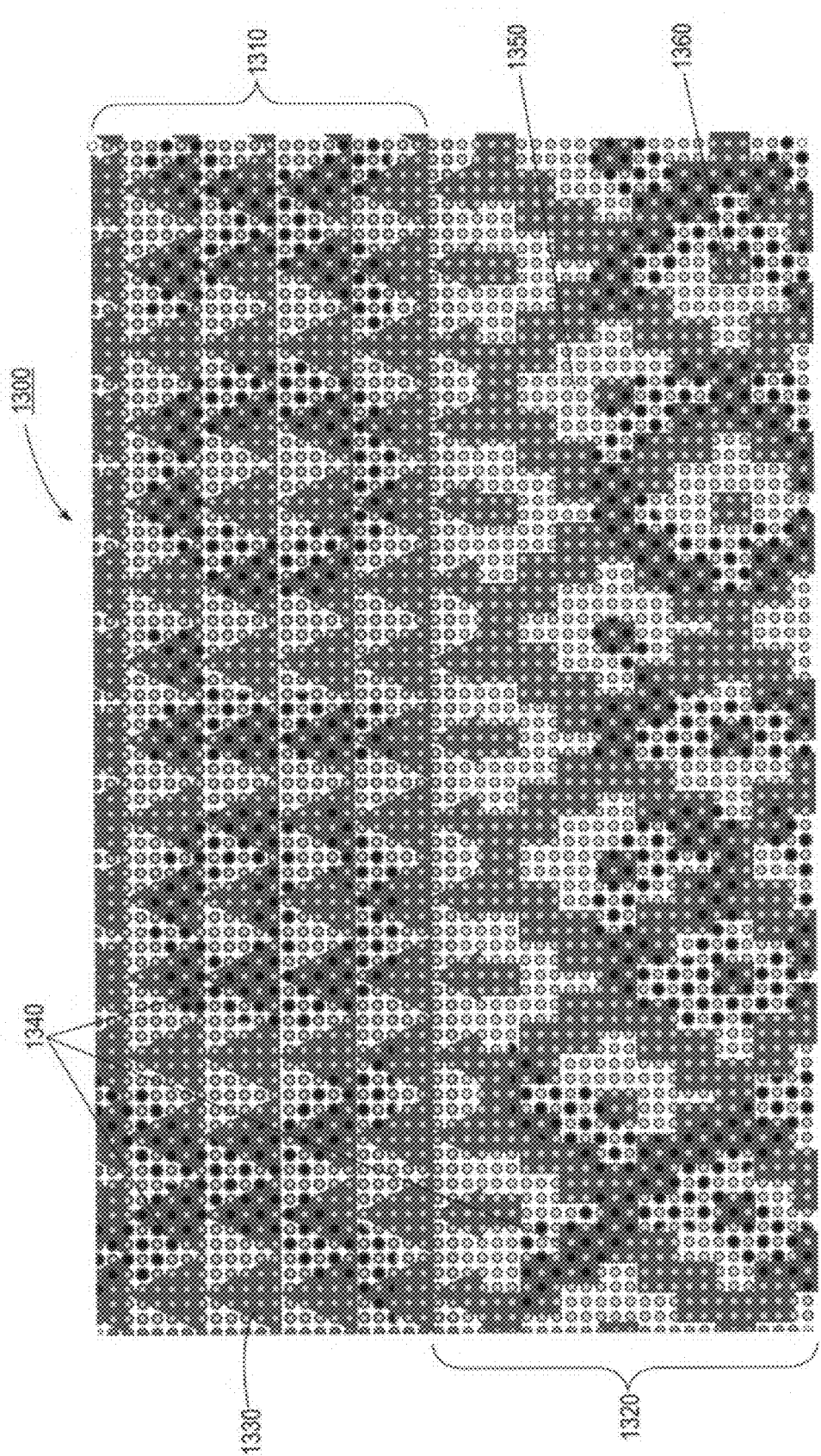
FIG. 20 shows an UV/florescence example of adding both a structure and color to an image to improve the color matching.

As illustrated in FIG. 20, an example of an UV(ultraviolet)/florescence effect is created by adding both a structure and color to enhance the hiding between the foreground and background pattern inks.

In this example, as illustrated in FIG. 20, the structure in the top half (1310) of the image 1300 is a triangle 1330. The triangle structure 1330 is in both the foreground and the background.

The background pattern ink colors may be cyan, magenta, and yellow while the foreground pattern ink colors may be red, blue, white, yellow, and magenta.

As illustrated in FIG. 20, the top half (1310) of the image 1300 includes the string "Xerox"™.

The structure in the bottom half (1320) of the image 1300 is a diamond 1350 and a small square 1360 at its center. The diamond 1350 and small square 1360 structure is in both the foreground and the background.

As illustrated in FIG. 20, the bottom half (1320) of the image 1300 includes the string "Xerox"™.

To enhance Specialty Imaging quality, color substrates are used in conjunction with Specialty Imaging color matching techniques, wherein at least one of the pattern inks has holes allowing the substrate color to show through.

To enhance quality, the substrate color that shows is matched in the other pattern ink by reproducing the same color via available markers, thereby realizing improved color matching (or better hiding) between the foreground and background pattern inks with little or no degradation in effect.

As noted above, to enhance quality, the substrate color that shows is matched in the other pattern ink by reproducing the same color via available markers.

Figure 21:
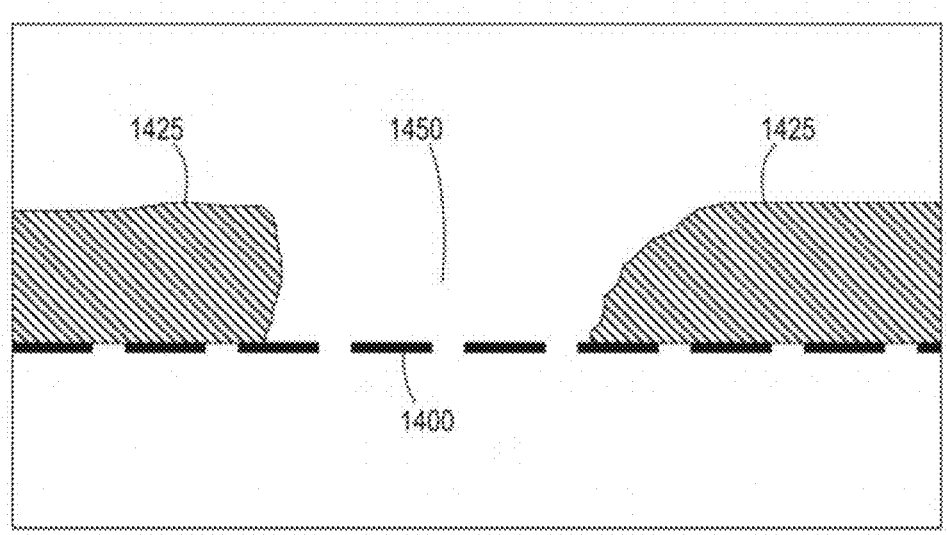

In realizing this enhancement, as illustrated in FIG. 21, one pattern ink allows the color of the substrate 1400 to be viewed via holes 1450 in the pattern ink 1425. The other pattern ink, as illustrated in FIG. 22, fills these holes with the matching color marker 1475

The pattern inks appear almost identical in color but exhibit differential properties in other areas, such as gloss effect.

This allows improved color consistency between the foreground and background pattern inks currently used in UV/florescence, IR, and gloss effects.

Figure 22:
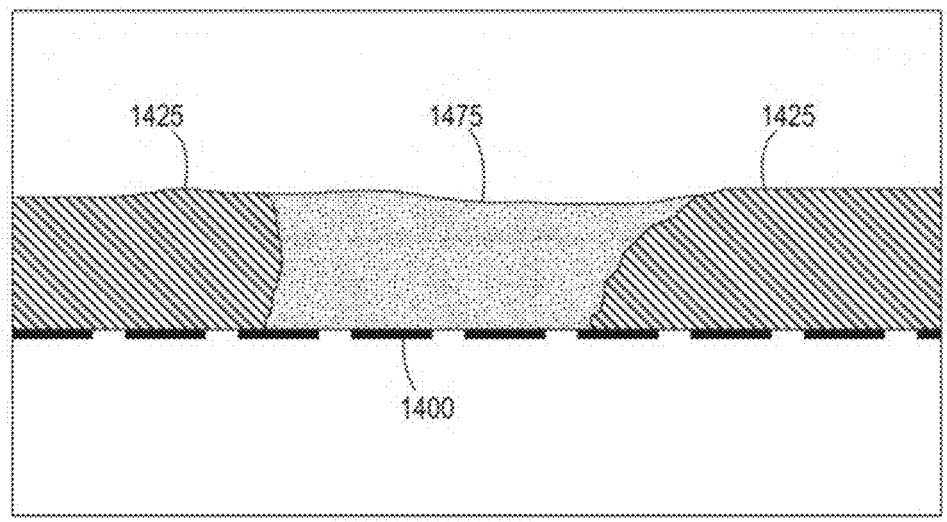
FIG. 22 shows a portion of a printed image having a hole to allow substrate show through wherein the hole is filled with a marking material matching the color of the substrate.

FIGS. 21 and 22 demonstrate the use of a colored substrate 1400 with a same color marker 1475.

FIG. 21 shows a colored (color1) substrate 1400 with black markers 1425 on both sides and no marker in the center (hole 1450). This example pattern ink shows colors black/color1/black, wherein color1 is from the substrate.

FIG. 22 appears the same color as FIG. 21, but has a difference in that color1 is from a marker. This difference can be used to create security elements such as UV markers.

In the cases where the substrate does not match a primary marker color in the printer, the appropriate mix of marker materials filling the holes can be used to achieve color consistency.

It is further noted that a comparison of images using holes showing yellow substrate and holes filled with yellow marker verses using holes showing white substrate and holes filled with yellow ink, the gloss effect works in all cases.

However, the color matching is improved when the holes are filled with a marking material, preferably a marking material matching the color of the substrate, by making it more difficult to read the text when the substrate is not tilted.

In summary, the use of a color substrate and matching color marker enhances Specialty Imaging quality. The color of the substrate shows through holes in one pattern ink, while the corresponding holes in another pattern ink are filled with a color marker matching the color of the substrate.

The differential properties between the filled and unfilled holes are used to create Specialty Imaging effects such as gloss and UV.

More specifically, if the holes are filled with a marking material having a color matching the color of the substrate upon which the image is being rendered, a gloss effect is realized.

If the holes are filled with a marking material having a color matching the color of the substrate upon which the image is being rendered, a UV effect is realized by the fluorescents in the recording medium or substrate showing through the holes.

It is further noted that a copier or scanner also views the substrate color and marker filled holes the same for superior anti-copy properties.

For example, if the image illustrated in FIG. 18 was rendered on a substrate having a color matching the color of the marking material associated with holes 1120, a copier or scanner would view the image illustrated in FIG. 18 as a solid color, not discerning the "H."

Figure 23:
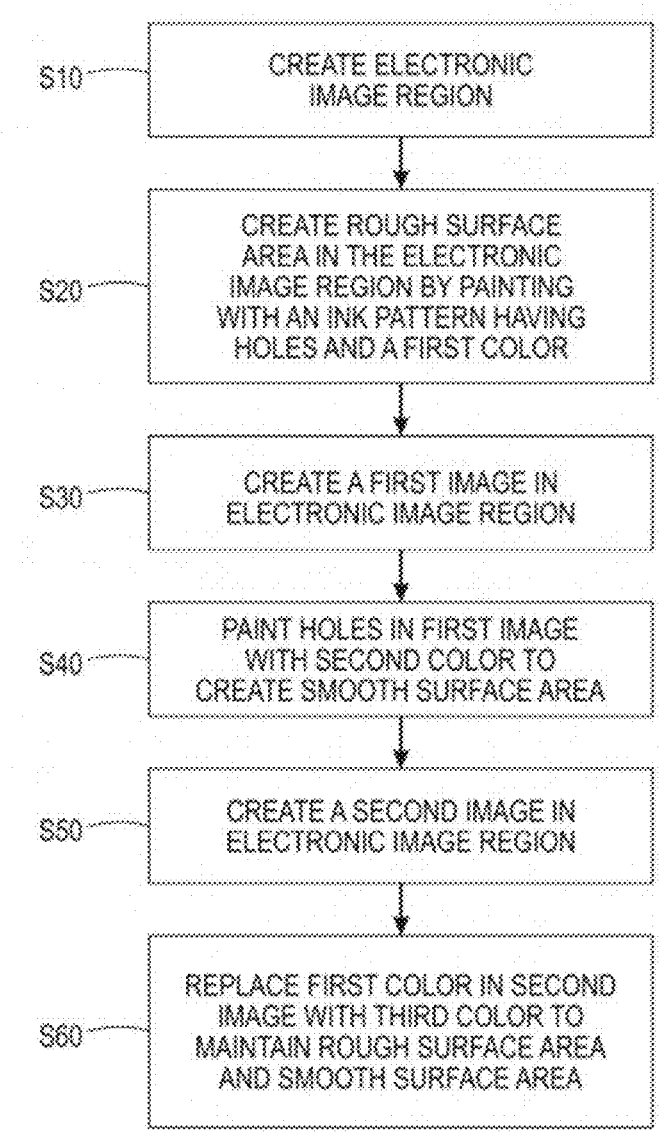
FIG. 23 shows a flowchart for creating an electronic image, which when rendered with marking materials, will have a seesaw gloss effect.

FIG. 23 illustrates a flowchart of an example of a process for creating gloss effect image patterns to be rendered on a recording medium. As illustrated in FIG. 23, an electronic image region is created at step S10. The electronic image region is created in an electronic memory (hardware) by a processor or controller (hardware) in conjunction with software and/or firmware.

At step S20, a rough surface emulation area is created in the electronic image region by electronically painting the electronic image region with an ink pattern that includes a first color and holes, wherein the holes are locations in the ink pattern where the first color is absent.

At step S30, a first image is electronically created in the electronic image region, and at step S40, holes in the first image are electronically painted with a second color to create a smooth surface emulation area in the first image in the electronic image region.

At step S50, a second image is electronically created in the electronic image region, and at step S60, the first color in the second image is electronically replaced with a third color to maintain a rough surface emulation area in the second image in the electronic image region where the first image does not intersect the second image and to maintain a smooth surface emulation area in the first image in the electronic image region where the first image intersects the second image.

The electronic image region resulting from the process, illustrated in FIG. 23, is rendered with marking materials on a recording medium such that the first image is visible when a relative angle between an observer's viewing angle and an angle of illuminating the recording medium by an illumination source is a first angle and the second image is visible when a relative angle between an observer's viewing angle and an angle of illuminating the recording medium by an illumination source is a second angle, the second angle being not equal to the first angle, the second image not being visible when the relative angle between an observer's viewing angle and an angle of illuminating the recording medium by an illumination source is the first angle.

Figure 24:
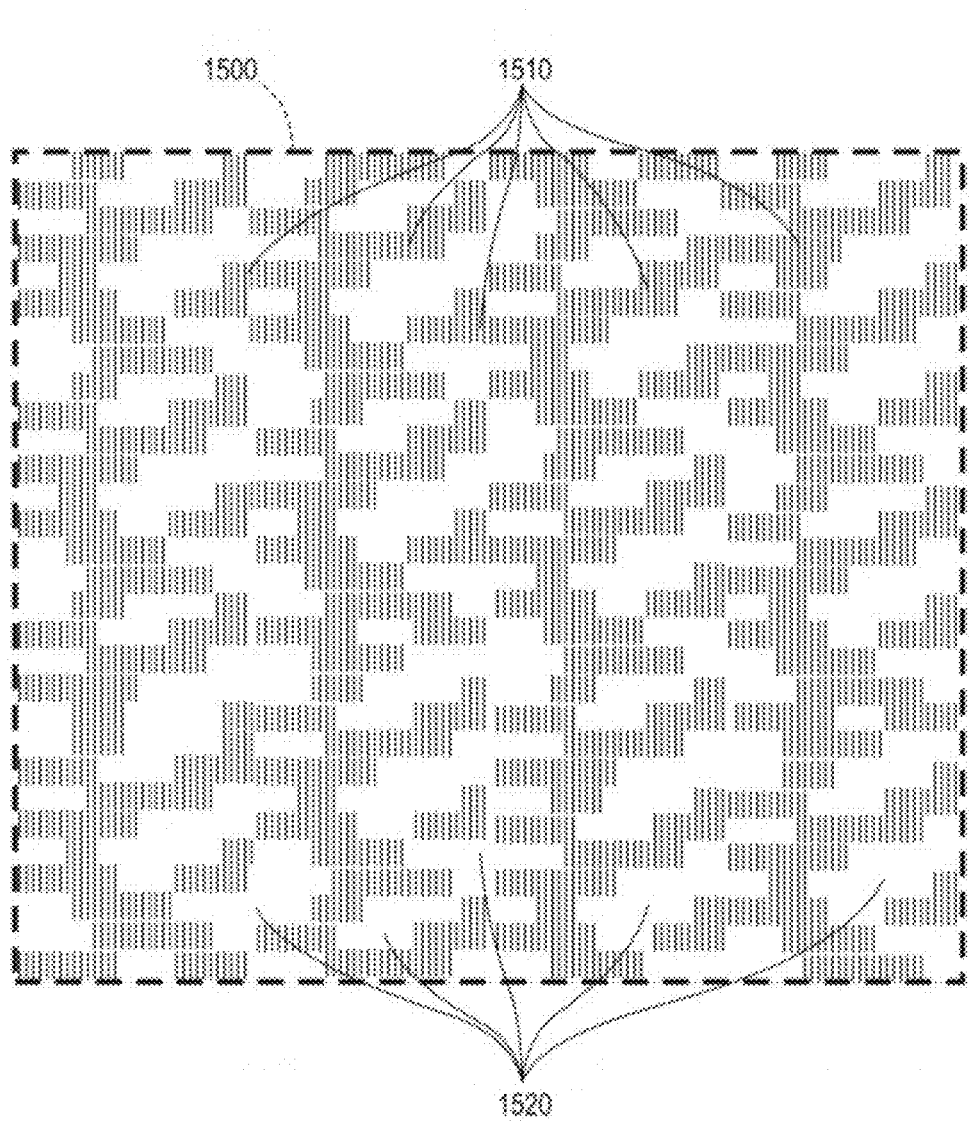
FIG. 24 illustrates an electronic image region having a first color and holes, which when rendered with marking materials, will have a rough surface.

FIG. 24 illustrates an electronic image region 1500, wherein the electronic image region has locations 1510 corresponding to a first color and locations 1520 corresponding to holes, holes being where the first color is absent.

It is noted that FIG. 24 may also illustrate a rendered electronic image region 1500, wherein the rendered electronic image region has locations 1510 corresponding to a first color and locations 1520 corresponding to holes, holes being where the first color is absent, to create a rough surface on a recording medium.

Figure 25:
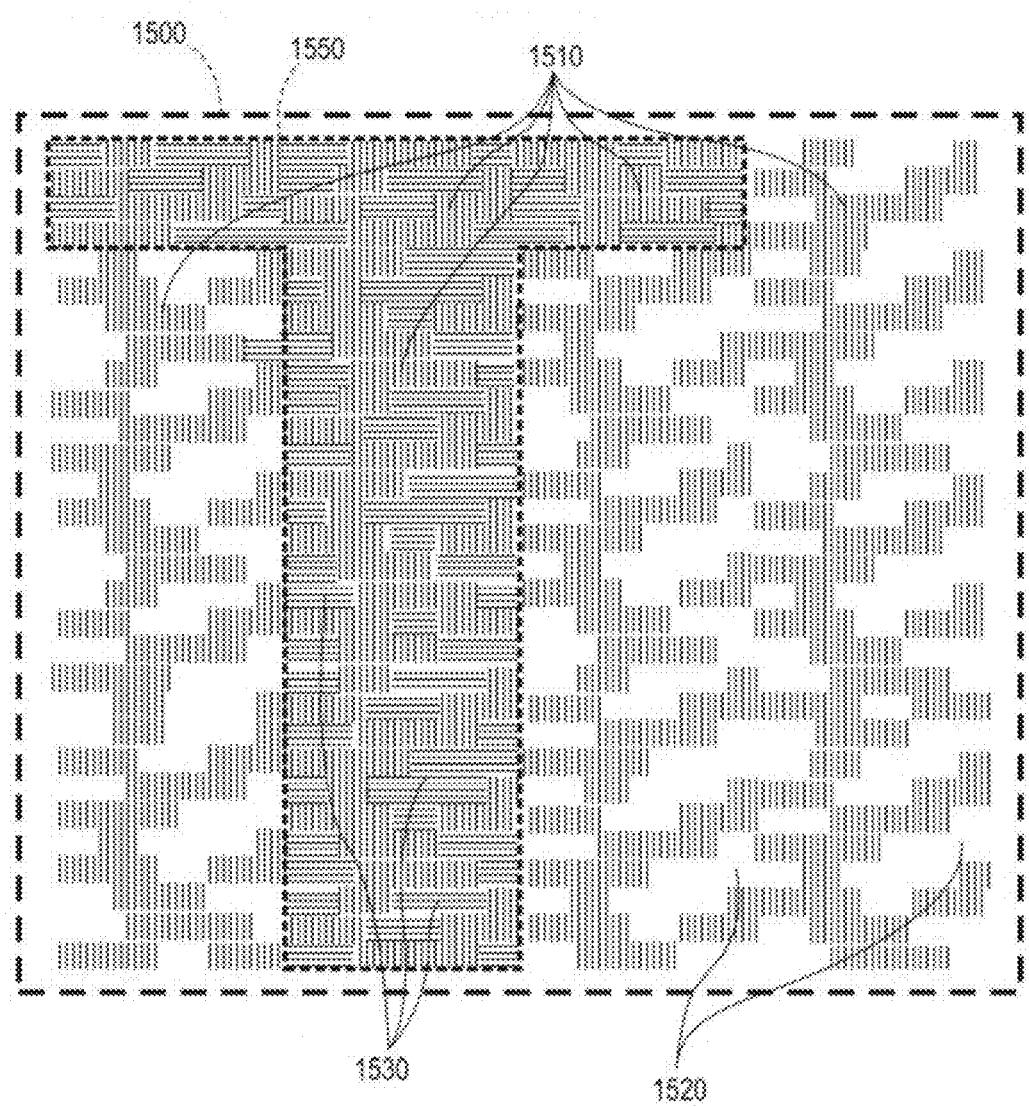
FIG. 25 illustrates an electronic image region having a first color and holes and a first image consisting of the first color and a second color, the first image, when rendered with marking materials, having a smooth surface where the first image is located.

FIG. 25 illustrates an electronic image region 1500 having a first image (letter T as identified by the dashed line) 1550.

As illustrated in FIG. 25, the electronic image region has locations 1510 (within and outside the first image 1550) corresponding to a first color and locations 1520 (outside the first image 1550) corresponding to holes, holes being where the first color is absent. FIG. 25 also illustrates that the electronic image region has locations 1530 (within the first image 1550) corresponding to a second color, It is noted that FIG. 25 may also illustrate a rendered electronic image region 1500, wherein the rendered electronic image region has a first image 1550, locations 1510 corresponding to a first color, locations 1530 corresponding to a second color, and locations 1520 corresponding to holes, holes being where the first color is absent, to create a rough surface on a recording medium that is outside the first image 1550 and to create a smooth surface on the recording medium that is within the first image 1550.

Figure 26:
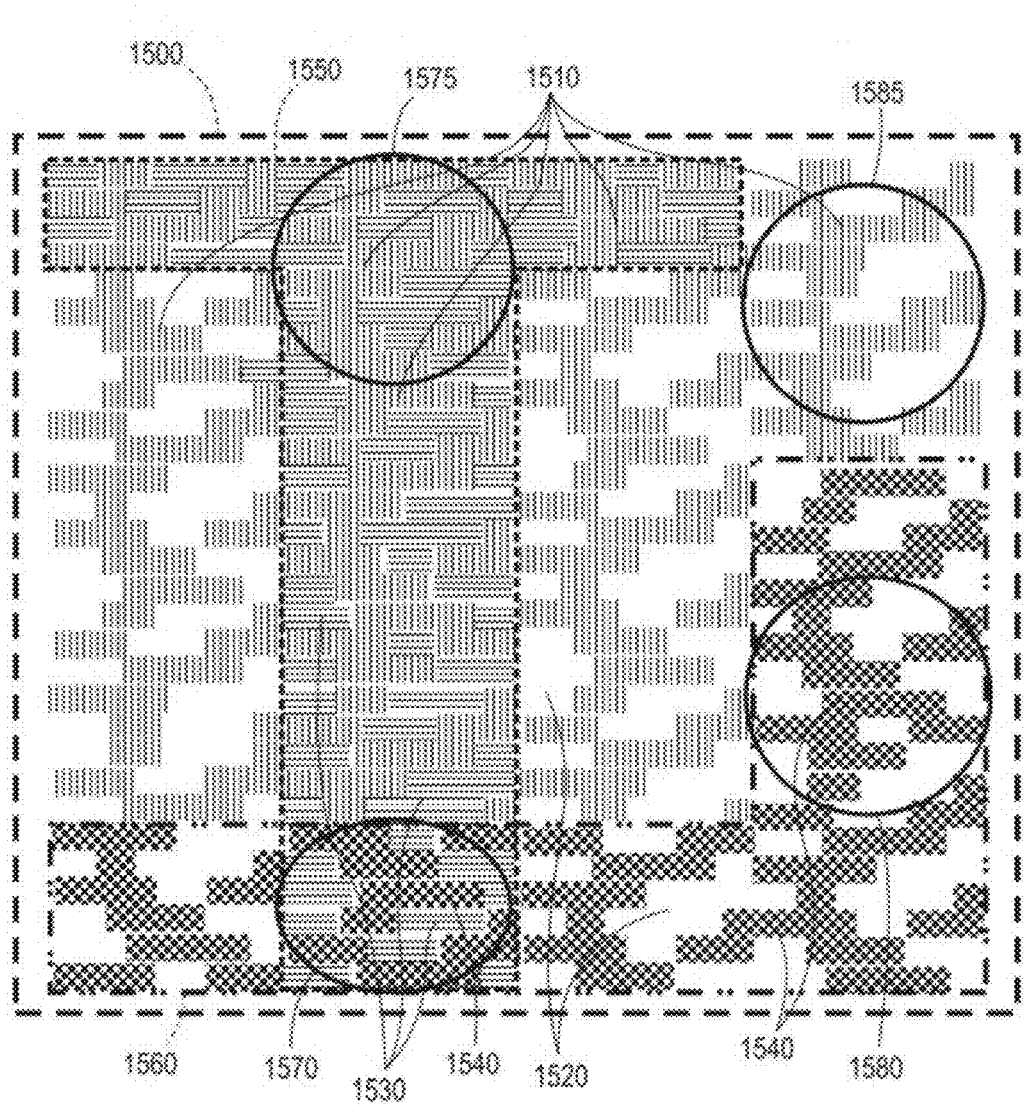
FIG. 26 illustrates an electronic image region having a first color and holes, a first image consisting of the first color and a second color, and a second image consisting of a third color, the second image, when rendered with marking materials, having a smooth surface where the first image is located and a rough surface where the second image does not intersect the first image.

FIG. 26 illustrates an electronic image region 1500 having a first image (letter T as identified by the dashed line) 1550 and a second image (letter L on its side as identified by a dashed/dotted line) 1560.

As illustrated in FIG. 26, the electronic image region has locations 1510 (within and outside the first image 1550) corresponding to a first color and locations 1520 (outside the first image 1550) corresponding to holes, holes being where the first color is absent. FIG. 26 also illustrates that the electronic image region has locations 1530 (within the first image 1550) corresponding to a second color, Furthermore, as illustrated in FIG. 26, the electronic image region has locations 1540 (within the first image 1550, where the first image 1550 intersects the second image 1560; e.g., region 1570; and within the second image 1560, where the first image 1550 does not intersect the second image 1560; e.g., region 1580) corresponding to a third color.

FIG. 26 illustrates a smooth surface emulation area 1575 (in the first image) in the electronic image region having locations 1510 corresponding to a first color and locations 1530 corresponding to a second color. FIG. 26 also illustrates a smooth surface emulation area 1530 (intersection of first and second images) in the electronic image region having locations 1550 corresponding to a third color and locations 1530 corresponding to a second color.

FIG. 26 illustrates a rough surface emulation area 1580 (in the second image) in the electronic image region having locations 1540 corresponding to a third color and locations 1520 corresponding to holes. FIG. 26 also illustrates a rough surface emulation area 1585 (outside the first and second images) in the electronic image region having locations 1510 corresponding to a first color and locations 1520 corresponding to holes.

It is noted that FIG. 26 may also illustrate a rendered electronic image region 1500, wherein the rendered electronic image region has a first image 1550, a second image 1560, locations 1510 corresponding to a first color, locations 1530 corresponding to a second color, locations 1530 corresponding to a third color, and locations 1520 corresponding to holes, holes being where the first color is absent.

The rendered electronic image region 1500 of FIG. 26 has a rough surface on a recording medium that is outside the first image 1550 and a smooth surface on the recording medium that is within the first image 1550, wherein the second image has a rough surface where the second image does not intersect the first image and has a smooth surface where the second image intersects the first image.

Figure 27:
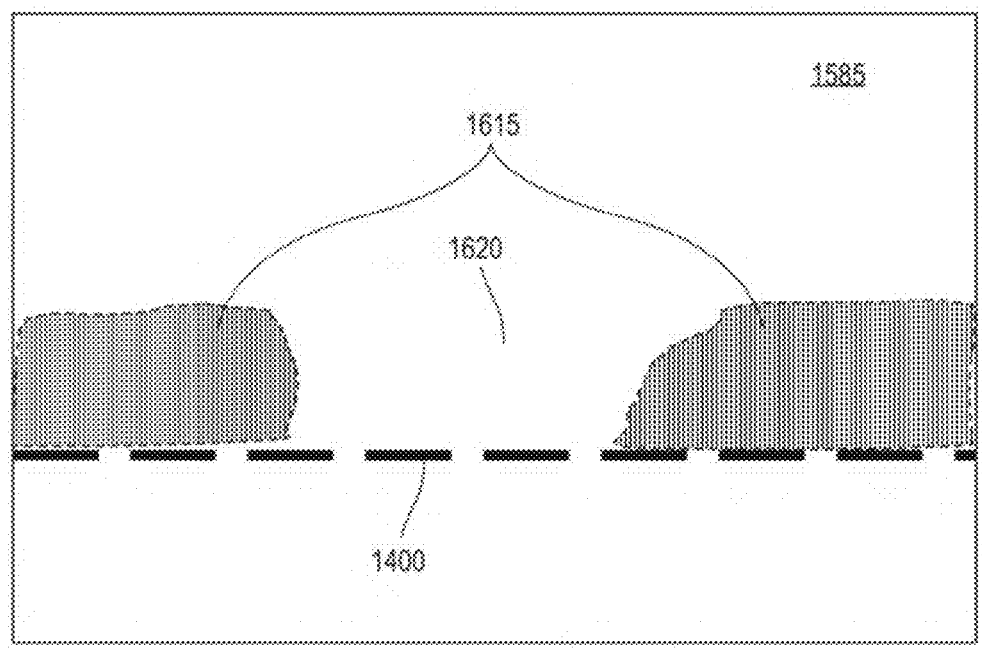
FIG. 27 illustrates the electronic image region of FIG. 24 rendered with marking material to create a rough surface.

FIG. 27 illustrates the rough surface emulation area 1585 of FIG. 26 rendered with marking material 1615 (corresponding to the first color) so that holes 1620 (absent of marking material 1615) are realized. The combination of the marking material 1615 and holes 1620 create a rough surface on the recording medium.

Figure 28:
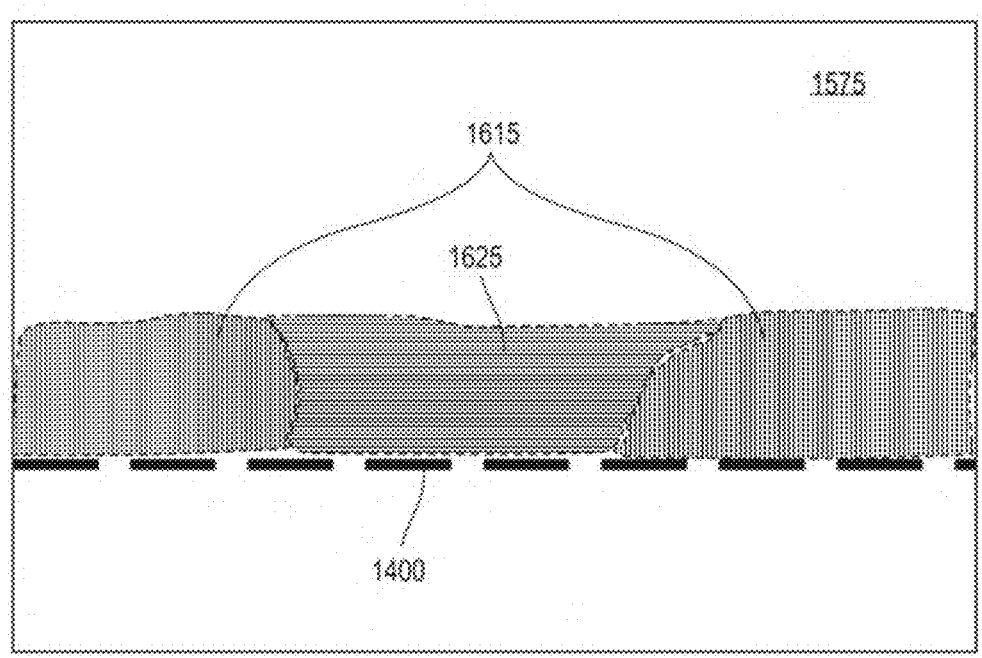
FIG. 28 illustrates the first image of the electronic image region of FIG. 25 rendered with marking material to create a smooth surface.

FIG. 28 illustrates the smooth surface emulation area 1575 of FIG. 26 rendered with marking material 1615 (corresponding to the first color) and marking material 1625 (corresponding to the second color). The combination of the marking material 1615 and marking material 1625 create a smooth surface on the recording medium.

Figure 29:
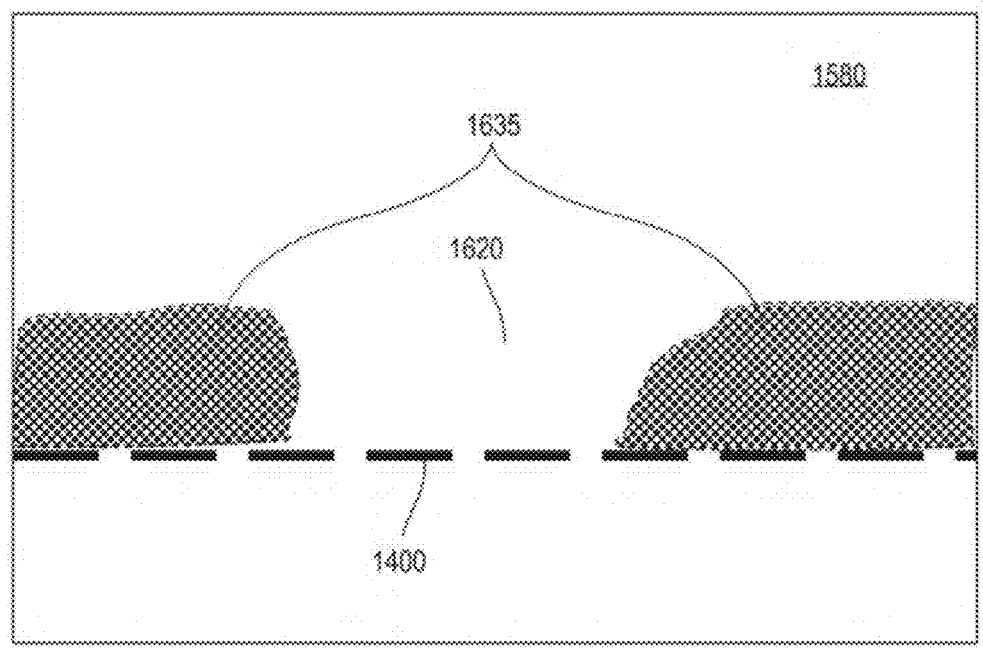
FIG. 29 illustrates the second image of the electronic image region of FIG. 26 rendered with marking material to create a rough surface where the second image does not intersect the first image.

FIG. 29 illustrates the rough surface emulation area 1580 of FIG. 26 rendered with marking material 1635 (corresponding to the third color) so that holes 1620 (absent of marking material 1635) are realized. The combination of the marking material 1635 and holes 1620 create a rough surface on the recording medium.

Figure 30:
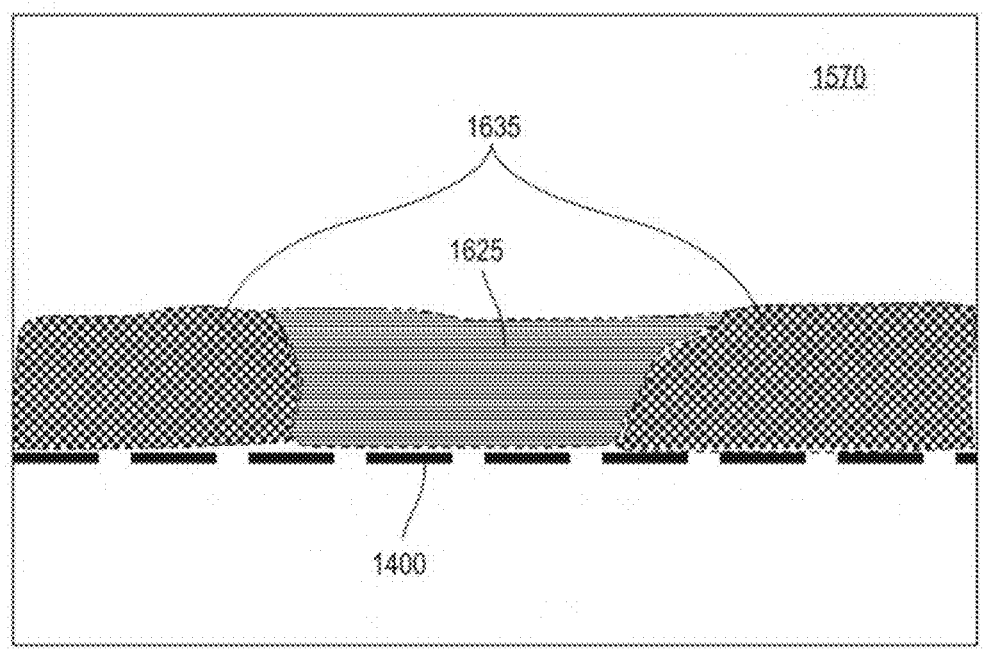
FIG. 30 illustrates the second image of the electronic image region of FIG. 26 rendered with marking material to create a smooth surface where the second image intersects the first image.

FIG. 30 illustrates the smooth surface emulation area 1570 of FIG. 26 rendered with marking material 1635 (corresponding to the third color) and marking material 1625 (corresponding to the second color). The combination of the marking material 1635 and marking material 1625 create a smooth surface on the recording medium.

Figure 31:
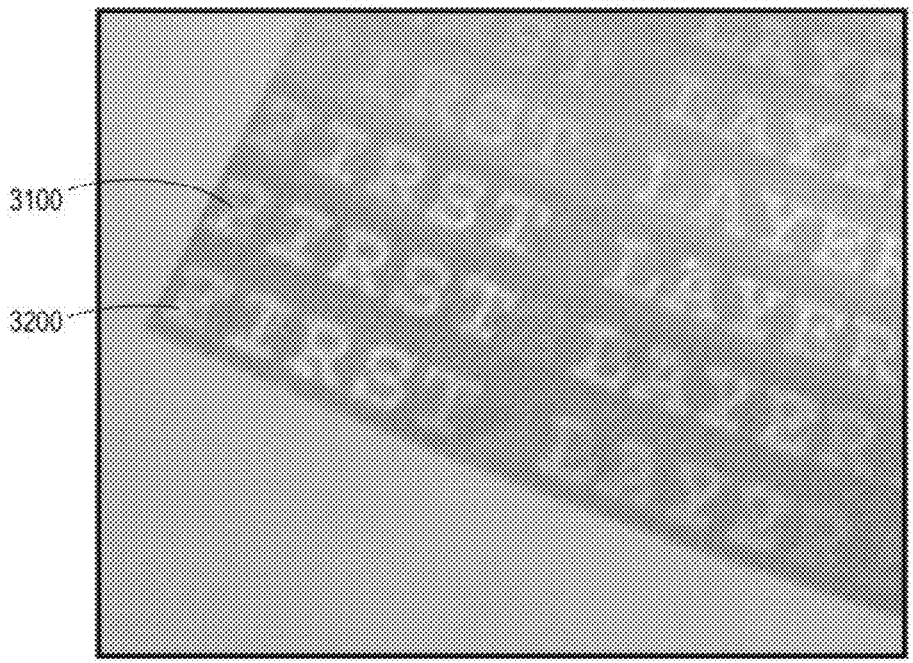
FIG. 31 illustrates a rendered recording medium, wherein the rendered recording medium is being viewed at a first angle to reveal the image "FIRST LAYER"

FIG. 31 illustrates a rendered recording medium, wherein the rendered recording medium is being viewed at a first angle. As illustrated in FIG. 31, an image row 3100 shows the image "FIRST LAYER" when the rendered recording medium is viewed at the first angle. Moreover, an image row 3200 shows the image "FIRST LAYER" when the rendered recording medium is viewed at the first angle.

Figure 32:
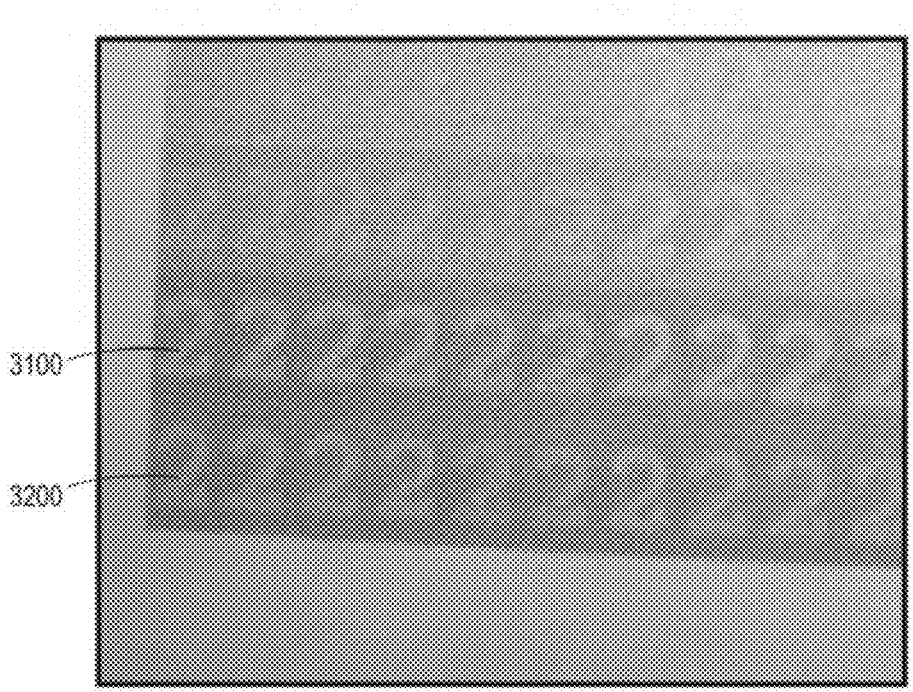
FIG. 32 illustrates the rendered recording medium of FIG. 31, wherein the rendered recording medium is being viewed at a second angle to reveal the image "2".

FIG. 32 illustrates the same rendered recording medium of FIG. 31, but the rendered recording medium is being viewed at a second angle. As illustrated in FIG. 32, the image row 3100 shows the image "2" when the rendered recording medium is viewed at the second angle. Moreover, the image row 3200 shows the image "2" when the rendered recording medium is viewed at the second angle. It is noted that upon viewing the rendered recording medium at the second angle, the image "FIRST LAYER" disappears.

The various examples discussed above result from a pattern ink see-saw scalable gloss effect based on one region having a relatively smooth surface while the second region has a relatively rougher surface. A third region is added composed of a color different than the first two. This third region has a relatively smooth surface where it intersects with the first region and a relatively rougher surface where it intersects with the second.

In the various embodiments described above, with respect to FIGS. 23-30, it is noted that the first color may be green, the second color may be yellow, and the third color may be red.

Furthermore, in the various embodiments described above, with respect to FIGS. 23-30, it is noted that the first color may be blue, the second color may be yellow, and the third color may be red.

In the various embodiments described above, with respect to FIGS. 23-30, it is noted that the background of the rendered electronic image region had a rough surface and the second image, in the non-intersecting regions, has a rough surface; however, it is noted that the background of the rendered electronic image region may have a smooth surface and the first image has a rough surface, creating a see-saw scalable gloss effect with a reverse polarity.

To realize the see-saw scalable gloss effect, a first ink pattern with a first color and holes is created. A second ink pattern is created with the first color and a second color, wherein the location of the second color corresponds to the locations of the holes in the first ink pattern. A first image is created having a background and a foreground. The background of the first image is painted with the first ink pattern, and the foreground of the first image is painted with the second ink pattern. A third ink pattern with a third color and holes is created. A fourth ink pattern is created with the third color and the second color, wherein the location of the second color corresponds to the locations of the holes in the third ink pattern. A second image is created having a foreground. The area where the foreground of the second image intersects with the background of the first image is painted with the third ink pattern. The area where the foreground of the second image intersects with the foreground of the first image is painted with the fourth ink pattern.

The process described above, when rendered on a recording medium, produces a rendering such that the first image is visible when a relative angle between an observer's viewing angle and an angle of illuminating the recording medium by an illumination source is a first angle and the second image is visible when a relative angle between an observer's viewing angle and an angle of illuminating the recording medium by an illumination source is a second angle, the second angle being not equal to the first angle, the second image not being visible when the relative angle between an observer's viewing angle and an angle of illuminating the recording medium by an illumination source is the first angle.

Alternatively, to realize the see-saw scalable gloss effect, a first ink pattern with a first color and holes is created. A first image is created having a background and a foreground. The background of the first image is painted with the first ink pattern. A predetermined number of holes in the background of the first image are painted with a second color. A second image is created having a background and a foreground. A stencil mask is created, wherein the stencil mask has holes to enable electronic painting therethrough and the holes of the stencil mask correspond to the locations of the first color in the first ink pattern. The foreground of the second image is electronically painted, using the stencil mask, with a third color.

The process described above, when rendered on a recording medium, produces a rendering such that the first image is visible when a relative angle between an observer's viewing angle and an angle of illuminating the recording medium by an illumination source is a first angle and the second image is visible when a relative angle between an observer's viewing angle and an angle of illuminating the recording medium by an illumination source is a second angle, the second angle being not equal to the first angle, the second image not being visible when the relative angle between an observer's viewing angle and an angle of illuminating the recording medium by an illumination source is the first angle.

In another embodiment, a system and method, using a processor and a print engine, render gloss effect image patterns on a recording medium by electronically creating an electronic image region and electronically creating a first electronic image having a background and a foreground. A second electronic image is electronically created having a foreground. A first electronic pattern ink is electronically created that includes a first color and first pattern holes. A second electronic pattern ink is electronically created that includes the first color and a second color. A third electronic pattern ink is electronically created that includes a third color and third pattern holes. A fourth electronic pattern ink is electronically created that includes the third color and the second color.

The electronic image region is electronically painted by electronically painting, using the first electronic pattern ink, the background of the first electronic image, electronically painting, using the second electronic pattern ink, the foreground of the first electronic image, electronically painting, using the third electronic pattern ink, the foreground of the second electronic image where the foreground of the second electronic image intersects with the background of the first electronic image, and electronically painting, using the fourth electronic pattern ink, the foreground of the second electronic image where the foreground of the second electronic image intersects with the foreground of the first electronic image.

The electronic image region is rendered, using marking materials, on the recording medium such that the first electronic image is visible when a relative angle between an observer's viewing angle and an angle of illuminating the recording medium by an illumination source is a first angle and the second electronic image is visible when a relative angle between an observer's viewing angle and an angle of illuminating the recording medium by an illumination source is a second angle, the second angle being not equal to the first angle, the second electronic image not being visible when the relative angle between an observer's viewing angle and an angle of illuminating the recording medium by an illumination source is the first angle.

In an additional embodiment, a system and method, using a processor and a print engine, render gloss effect image patterns on a recording medium by electronically creating an electronic image region; electronically creating a first electronic image having a background and a foreground; electronically creating a second electronic image having a foreground; electronically creating a first electronic pattern ink, the first electronic pattern ink including a first color and first pattern holes; electronically creating a second electronic pattern ink, the second electronic pattern ink including the first color and a second color; electronically creating a third electronic pattern ink, the third electronic pattern ink including a third color and third pattern holes; electronically creating a fourth electronic pattern ink, the fourth electronic pattern ink including the third color and the second color.

The electronic image region is electronically painted by electronically painting, using the first electronic pattern ink, the foreground of the first electronic image, electronically painting, using the second electronic pattern ink, the background of the first electronic image, electronically painting, using the fourth electronic pattern ink, the foreground of the second electronic image where the foreground of the second electronic image intersects with the background of the first electronic image, and electronically painting, using the third electronic pattern ink, the foreground of the second electronic image where the foreground of the second electronic image intersects with the foreground of the first electronic image.

The electronic image region is rendered, using marking materials, on the recording medium such that the first electronic image is visible when a relative angle between an observer's viewing angle and an angle of illuminating the recording medium by an illumination source is a first angle and the second electronic image is visible when a relative angle between an observer's viewing angle and an angle of illuminating the recording medium by an illumination source is a second angle, the second angle being not equal to the first angle, the first electronic image not being visible when the relative angle between an observer's viewing angle and an angle of illuminating the recording medium by an illumination source is the second angle.

In a further embodiment, a system and method, using a processor and a print engine, render gloss effect image patterns on a recording medium by electronically creating a first electronic pattern ink, the first electronic pattern ink including a first color and holes, the holes representing locations in the first electronic pattern ink where the first color is absent; electronically creating an electronic image region; electronically painting, using the first electronic pattern ink, the electronic image region to create an electronic image region background having first color locations and holes, the first color locations representing locations in the electronic image region background where the first color is present, the holes representing locations in the electronic image region background where the first color is absent; electronically painting a first predetermined portion of the holes within the electronic image region background with a second color to create a first image in the electronic image region; and electronically replacing a predetermined portion of the first color locations within the electronic image region background with a third color to create a second image in the electronic image region.

The electronic image region is rendered, using marking materials, on the recording medium such that the first image is visible when a relative angle between an observer's viewing angle and an angle of illuminating the recording medium by an illumination source is a first angle and the second image is visible when a relative angle between an observer's viewing angle and an angle of illuminating the recording medium by an illumination source is a second angle, the second angle being not equal to the first angle, the second image not being visible when the relative angle between an observer's viewing angle and an angle of illuminating the recording medium by an illumination source is the first angle.

In another embodiment, a system and method, using a processor and a print engine, render gloss effect image patterns on a recording medium by electronically creating a first electronic pattern ink, the first electronic pattern ink including a first color and holes, the holes representing locations in the first electronic pattern ink where the first color is absent; electronically creating an electronic image region; electronically painting, using the first electronic pattern ink, the electronic image region to create an electronic image region background having first color locations and holes, the first color locations representing locations in the electronic image region background where the first color is present, the holes representing locations in the electronic image region background where the first color is absent; electronically painting a first predetermined portion of the holes within the electronic image region background with a second color to create a first image in the electronic image region; electronically creating a second image; electronically creating a stencil mask, the stencil mask having holes therein the holes having locations in the stencil mask, the holes enabling electronic painting through the holes, the holes corresponding to the first color locations; and electronically painting, using the stencil mask, the second image with a third color.

The electronic image region is rendered, using marking materials, on the recording medium such that the first image is visible when a relative angle between an observer's viewing angle and an angle of illuminating the recording medium by an illumination source is a first angle and the second image is visible when a relative angle between an observer's viewing angle and an angle of illuminating the recording medium by an illumination source is a second angle, the second angle being not equal to the first angle, the second image not being visible when the relative angle between an observer's viewing angle and an angle of illuminating the recording medium by an illumination source is the first angle.

In a further embodiment, a system and method, using a processor and a print engine, render gloss effect image patterns on a recording medium by electronically creating a first electronic pattern ink, the first electronic pattern ink including a first color and holes, the holes representing locations in the first electronic pattern ink where the first color is absent; electronically creating an electronic image region; electronically painting, using the first electronic pattern ink, the electronic image region to create an electronic image region background having first color locations and holes, the first color locations representing locations in the electronic image region background where the first color is present, the holes representing locations in the electronic image region background where the first color is absent; electronically painting a first predetermined portion of the holes within the electronic image region background with a second color to create a first image in the electronic image region; electronically creating a second electronic pattern ink, the second electronic pattern ink including a third color and holes, the holes representing locations in the second electronic pattern ink where the third color is absent; electronically creating a second image; and electronically painting, using the second electronic pattern ink, the second image.

The electronic image region is rendered, using marking materials, on the recording medium such that the first image is visible when a relative angle between an observer's viewing angle and an angle of illuminating the recording medium by an illumination source is a first angle and the second image is visible when a relative angle between an observer's viewing angle and an angle of illuminating the recording medium by an illumination source is a second angle, the second angle being not equal to the first angle, the second image not being visible when the relative angle between an observer's viewing angle and an angle of illuminating the recording medium by an illumination source is the first angle.

In summary, a method for rendering gloss effect image patterns on a recording medium electronically creates an electronic image region; electronically creates a first electronic image having a background and a foreground; electronically creates a second electronic image having a foreground; electronically creates a first electronic pattern ink, the first electronic pattern ink including a first color and first pattern holes, the first pattern holes having locations in the first electronic pattern ink, the first pattern holes being locations in the first electronic pattern ink where the first color is absent; electronically creates a second electronic pattern ink, the second electronic pattern ink including the first color and a second color, the second color having locations in the second electronic pattern ink, the locations of the second color in the second electronic pattern ink corresponding to the locations of the first pattern holes in the first electronic pattern ink; electronically creates a third electronic pattern ink, the third electronic pattern ink including a third color and third pattern holes, the third pattern holes having locations in the third electronic pattern ink, the third pattern holes being locations in the third electronic pattern ink where the third color is absent; electronically creates a fourth electronic pattern ink, the fourth electronic pattern ink including the third color and the second color, the second color having locations in the fourth electronic pattern ink, the locations of the second color in the fourth electronic pattern ink corresponding to the locations of the first pattern holes in the first electronic pattern ink; electronically paints the electronic image region by electronically painting, using the first electronic pattern ink, the background of the first electronic image, electronically painting, using the second electronic pattern ink, the foreground of the first electronic image, electronically painting, using the third electronic pattern ink, the foreground of the second electronic image where the foreground of the second electronic image intersects with the background of the first electronic image, and electronically painting, using the fourth electronic pattern ink, the foreground of the second electronic image where the foreground of the second electronic image intersects with the foreground of the first electronic image; and renders, using marking materials, the electronic image region on the recording medium such that the first electronic image is visible when a relative angle between an observer's viewing angle and an angle of illuminating the recording medium by an illumination source is a first angle and the second electronic image is visible when a relative angle between an observer's viewing angle and an angle of illuminating the recording medium by an illumination source is a second angle, the second angle being not equal to the first angle, the second electronic image not being visible when the relative angle between an observer's viewing angle and an angle of illuminating the recording medium by an illumination source is the first angle.

The locations of the third pattern holes in the third electronic pattern ink may correspond to the locations of the first pattern holes in the first electronic pattern ink. The rendered foreground of the first electronic image may be a substantially smooth surface. The rendered background of the first electronic image may be a substantially rough surface. The rendered intersection of the foreground of the first electronic image and the foreground of the second electronic image may be a substantially smooth surface. The rendered intersection of the background of the first electronic image and the foreground of the second electronic image may be a substantially rough surface.

A system for rendering gloss effect image patterns on a recording medium, including a processor and a print engine, The processor electronically creates an electronic image region, a first electronic image having a background and a foreground, a second electronic image having a foreground, a first electronic pattern ink, a second electronic pattern ink, a third electronic pattern ink, and a fourth electronic pattern ink; the first electronic pattern ink including a first color and first pattern holes, the first pattern holes having locations in the first electronic pattern ink, the first pattern holes being locations in the first electronic pattern ink where the first color may be absent; the second electronic pattern ink including the first color and a second color, the second color having locations in the second electronic pattern ink, the locations of the second color in the second electronic pattern ink corresponding to the locations of the first pattern holes in the first electronic pattern ink; the third electronic pattern ink including a third color and third pattern holes, the third pattern holes having locations in the third electronic pattern ink, the third pattern holes being locations in the third electronic pattern ink where the third color may be absent; the fourth electronic pattern ink including the third color and the second color, the second color having locations in the fourth electronic pattern ink, the locations of the second color in the fourth electronic pattern ink corresponding to the locations of the first pattern holes in the first electronic pattern ink.

The processor electronically paints the electronic image region by electronically painting, using the first electronic pattern ink, the background of the first electronic image; electronically painting, using the second electronic pattern ink, the foreground of the first electronic image; electronically painting, using the third electronic pattern ink, the foreground of the second electronic image where the foreground of the second electronic image intersects with the background of the first electronic image; and electronically painting, using the fourth electronic pattern ink, the foreground of the second electronic image where the foreground of the second electronic image intersects with the foreground of the first electronic image.

The print engine renders, using marking materials, the electronic image region on the recording medium such that the first electronic image may be visible when a relative angle between an observer's viewing angle and an angle of illuminating the recording medium by an illumination source may be a first angle and the second electronic image may be visible when a relative angle between an observer's viewing angle and an angle of illuminating the recording medium by an illumination source may be a second angle, the second angle being not equal to the first angle, the second electronic image not being visible when the relative angle between an observer's viewing angle and an angle of illuminating the recording medium by an illumination source may be the first angle.

The locations of the third pattern holes in the third electronic pattern ink may correspond to the locations of the first pattern holes in the first electronic pattern ink. The rendered foreground of the first electronic image may be a substantially smooth surface. The rendered background of the first electronic image may be a substantially rough surface. The rendered intersection of the foreground of the first electronic image and the foreground of the second electronic image may be a substantially smooth surface. The rendered intersection of the background of the first electronic image and the foreground of the second electronic image may be a substantially rough surface.

A recording medium includes a substrate; and marking materials formed on the substrate. The marking materials forms, in a first region of the substrate, a first image being a first color and having a non-smooth structure, the non-smooth structure being realized by first and second locations in the first image, the first locations in the first image being locations where marking material corresponding to the first color may be absent on the substrate, the second locations in the first image being locations where marking material corresponding to the first color may be formed on the substrate, the first locations of the first image having a first marking material height, the second locations of the first image having a second marking material height, the first marking material height of the first locations of the first image not being equal to the second marking material height of the second locations of the first image.

The marking materials forms, in a second region of the substrate, a second image being the first color and a second color and having a smooth structure, the smooth structure being realized by first and second locations in the second image, the first locations in the second image being locations where marking material corresponding to the first color may be formed on the substrate, the second locations in the second image being locations where marking material corresponding to the second color may be formed on the substrate, the first locations of the second image having a first marking material height, the second locations of the second image having a second marking material height, the first marking material height of the first locations of the second image being substantially equal to the second marking material height of the second locations of the second image.

The marking materials forms, in a third region of the substrate, a third image being a third color and having a non-smooth structure, the non-smooth structure being realized by first and second locations in the third image, the first locations in the third image being locations where marking material corresponding to the third color may be absent on the substrate, the second locations in the third image being locations where marking material corresponding to the third color may be formed on the substrate, the first locations of the third image having a first marking material height, the second locations of the third image having a second marking material height, the first marking material height of the first locations of the third image not being equal to the second marking material height of the second locations of the third image.

The marking materials forms, in a fourth region of the substrate, a fourth image being the third color and the second color and having a smooth structure, the smooth structure being realized by first and second locations in the fourth image, the first locations in the fourth image being locations where marking material corresponding to the third color may be formed on the substrate, the second locations in the fourth image being locations where marking material corresponding to the second color may be formed on the substrate, the first locations of the fourth image having a first marking material height, the second locations of the fourth image having a second marking material height, the first marking material height of the first locations of the fourth image being substantially equal to the second marking material height of the second locations of the fourth image.

The second image is visible when a relative angle between an observer's viewing angle and an angle of illuminating the recording medium by an illumination source may be a first angle. The third and fourth images is visible when a relative angle between an observer's viewing angle and an angle of illuminating the recording medium by an illumination source may be a second angle, the second angle being not equal to the first angle. The third image is not visible when the relative angle between an observer's viewing angle and an angle of illuminating the recording medium by an illumination source may be the first angle.

A method for rendering gloss effect image patterns on a recording medium electronically creates an electronic image region; electronically creates a first electronic image having a background and a foreground; electronically creates a second electronic image having a foreground; electronically creates a first electronic pattern ink, the first electronic pattern ink including a first color and first pattern holes, the first pattern holes having locations in the first electronic pattern ink, the first pattern holes being locations in the first electronic pattern ink where the first color may be absent; electronically creates a second electronic pattern ink, the second electronic pattern ink including the first color and a second color, the second color having locations in the second electronic pattern ink, the locations of the second color in the second electronic pattern ink corresponding to the locations of the first pattern holes in the first electronic pattern ink; electronically creates a third electronic pattern ink, the third electronic pattern ink including a third color and third pattern holes, the third pattern holes having locations in the third electronic pattern ink, the third pattern holes being locations in the third electronic pattern ink where the third color may be absent; electronically creates a fourth electronic pattern ink, the fourth electronic pattern ink including the third color and the second color, the second color having locations in the fourth electronic pattern ink, the locations of the second color in the fourth electronic pattern ink corresponding to the locations of the first pattern holes in the first electronic pattern ink; electronically paints the electronic image region by electronically painting, using the first electronic pattern ink, the foreground of the first electronic image, electronically painting, using the second electronic pattern ink, the background of the first electronic image, electronically painting, using the fourth electronic pattern ink, the foreground of the second electronic image where the foreground of the second electronic image intersects with the background of the first electronic image, and electronically painting, using the third electronic pattern ink, the foreground of the second electronic image where the foreground of the second electronic image intersects with the foreground of the first electronic image; and renders, using marking materials, the electronic image region on the recording medium such that the first electronic image may be visible when a relative angle between an observer's viewing angle and an angle of illuminating the recording medium by an illumination source may be a first angle and the second electronic image may be visible when a relative angle between an observer's viewing angle and an angle of illuminating the recording medium by an illumination source may be a second angle, the second angle being not equal to the first angle, the first electronic image not being visible when the relative angle between an observer's viewing angle and an angle of illuminating the recording medium by an illumination source may be the second angle.

The locations of the third pattern holes in the third electronic pattern ink may correspond to the locations of the first pattern holes in the first electronic pattern ink. The rendered foreground of the first electronic image may be a substantially rough surface. The rendered background of the first electronic image may be a substantially smooth surface. The rendered intersection of the foreground of the first electronic image and the foreground of the second electronic image may be a substantially rough surface. The rendered intersection of the background of the first electronic image and the foreground of the second electronic image may be a substantially smooth surface.

A system for rendering gloss effect image patterns on a recording medium includes a processor and a print engine. The processor electronically creates an electronic image region, a first electronic image having a background and a foreground, a second electronic image having a foreground, a first electronic pattern ink, a second electronic pattern ink, a third electronic pattern ink, and a fourth electronic pattern ink; the first electronic pattern ink including a first color and first pattern holes, the first pattern holes having locations in the first electronic pattern ink, the first pattern holes being locations in the first electronic pattern ink where the first color may be absent; the second electronic pattern ink including the first color and a second color, the second color having locations in the second electronic pattern ink, the locations of the second color in the second electronic pattern ink corresponding to the locations of the first pattern holes in the first electronic pattern ink; the third electronic pattern ink including a third color and third pattern holes, the third pattern holes having locations in the third electronic pattern ink, the third pattern holes being locations in the third electronic pattern ink where the third color may be absent; the fourth electronic pattern ink including the third color and the second color, the second color having locations in the fourth electronic pattern ink, the locations of the second color in the fourth electronic pattern ink corresponding to the locations of the first pattern holes in the first electronic pattern ink.

The processor electronically paints the electronic image region by electronically painting, using the first electronic pattern ink, the foreground of the first electronic image; electronically painting, using the second electronic pattern ink, the background of the first electronic image; electronically painting, using the fourth electronic pattern ink, the foreground of the second electronic image where the foreground of the second electronic image intersects with the background of the first electronic image; and electronically painting, using the third electronic pattern ink, the foreground of the second electronic image where the foreground of the second electronic image intersects with the foreground of the first electronic image.

The print engine renders, using marking materials, the electronic image region on the recording medium such that the first electronic image may be visible when a relative angle between an observer's viewing angle and an angle of illuminating the recording medium by an illumination source may be a first angle and the second electronic image may be visible when a relative angle between an observer's viewing angle and an angle of illuminating the recording medium by an illumination source may be a second angle, the second angle being not equal to the first angle, the first electronic image not being visible when the relative angle between an observer's viewing angle and an angle of illuminating the recording medium by an illumination source may be the second angle.

The locations of the third pattern holes in the third electronic pattern ink may correspond to the locations of the first pattern holes in the first electronic pattern ink. The rendered foreground of the first electronic image may be a substantially rough surface. The rendered background of the first electronic image may be a substantially smooth surface. The rendered intersection of the foreground of the first electronic image and the foreground of the second electronic image may be a substantially rough surface. The rendered intersection of the background of the first electronic image and the foreground of the second electronic image may be a substantially smooth surface.

A recording medium includes a substrate and marking materials formed on the substrate.

The marking materials forms, in a first region of the substrate, a first image being a first color and having a non-smooth structure, the non-smooth structure being realized by first and second locations in the first image, the first locations in the first image being locations where marking material corresponding to the first color may be absent on the substrate, the second locations in the first image being locations where marking material corresponding to the first color may be formed on the substrate, the first locations of the first image having a first marking material height, the second locations of the first image having a second marking material height, the first marking material height of the first locations of the first image not being equal to the second marking material height of the second locations of the first image.

The marking materials forms, in a second region of the substrate, a second image being the first color and a second color and having a smooth structure, the smooth structure being realized by first and second locations in the second image, the first locations in the second image being locations where marking material corresponding to the first color may be formed on the substrate, the second locations in the second image being locations where marking material corresponding to the second color may be formed on the substrate, the first locations of the second image having a first marking material height, the second locations of the second image having a second marking material height, the first marking material height of the first locations of the second image being substantially equal to the second marking material height of the second locations of the second image.

The marking materials forms, in a third region of the substrate, a third image being a third color and having a non-smooth structure, the non-smooth structure being realized by first and second locations in the third image, the first locations in the third image being locations where marking material corresponding to the third color may be absent on the substrate, the second locations in the third image being locations where marking material corresponding to the third color may be formed on the substrate, the first locations of the third image having a first marking material height, the second locations of the third image having a second marking material height, the first marking material height of the first locations of the third image not being equal to the second marking material height of the second locations of the third image.

The marking materials forms, in a fourth region of the substrate, a fourth image being the third color and the second color and having a smooth structure, the smooth structure being realized by first and second locations in the fourth image, the first locations in the fourth image being locations where marking material corresponding to the third color may be formed on the substrate, the second locations in the fourth image being locations where marking material corresponding to the second color may be formed on the substrate, the first locations of the fourth image having a first marking material height, the second locations of the fourth image having a second marking material height, the first marking material height of the first locations of the fourth image being substantially equal to the second marking material height of the second locations of the fourth image.

The fourth image is visible when a relative angle between an observer's viewing angle and an angle of illuminating the recording medium by an illumination source may be a first angle. The first and third images is visible when a relative angle between an observer's viewing angle and an angle of illuminating the recording medium by an illumination source may be a second angle, the second angle being not equal to the first angle. The first and third image is not visible when the relative angle between an observer's viewing angle and an angle of illuminating the recording medium by an illumination source may be the first angle.

A method for rendering gloss effect image patterns on a recording medium electronically creates an electronic image region; electronically creates a first electronic image having a background and a foreground; electronically creates a second electronic image having a foreground; electronically creates a first electronic pattern ink, the first electronic pattern ink including a first color and first pattern holes, the first pattern holes having locations in the first electronic pattern ink, the first pattern holes being locations in the first electronic pattern ink where the first color may be absent; electronically creates a second electronic pattern ink, the second electronic pattern ink including the first color and a second color, the second color having locations in the second electronic pattern ink, the locations of the second color in the second electronic pattern ink corresponding to the locations of the first pattern holes in the first electronic pattern ink; electronically creates a third electronic pattern ink, the third electronic pattern ink including a third color and the second color, the second color having locations in the third electronic pattern ink, the locations of the second color in the third electronic pattern ink corresponding to the locations of the first pattern holes in the first electronic pattern ink; electronically paints the electronic image region by electronically painting, using the second electronic pattern ink, the background of the first electronic image, electronically painting, using the first electronic pattern ink, the foreground of the first electronic image, and electronically painting, using the third electronic pattern ink, the foreground of the second electronic image; and renders, using marking materials, the electronic image region on the recording medium such that the first electronic image may be visible when a relative angle between an observer's viewing angle and an angle of illuminating the recording medium by an illumination source may be a first angle and the second electronic image may be visible when a relative angle between an observer's viewing angle and an angle of illuminating the recording medium by an illumination source may be a second angle, the second angle being not equal to the first angle, the first electronic image not being visible when the relative angle between an observer's viewing angle and an angle of illuminating the recording medium by an illumination source may be the second angle.

The rendered foreground of the first electronic image may be a substantially rough surface. The rendered background of the first electronic image may be a substantially smooth surface. The rendered intersection of the foreground of the first electronic image and the foreground of the second electronic image may be a substantially smooth surface. The rendered intersection of the background of the first electronic image and the foreground of the second electronic image may be a substantially smooth surface.

A system for rendering gloss effect image patterns on a recording medium includes a processor and a print engine.

The processor electronically creates an electronic image region, a first electronic image having a background and a foreground, a second electronic image having a foreground, a first electronic pattern ink, a second electronic pattern ink, and a third electronic pattern ink; the first electronic pattern ink including a first color and first pattern holes, the first pattern holes having locations in the first electronic pattern ink, the first pattern holes being locations in the first electronic pattern ink where the first color may be absent; the second electronic pattern ink including the first color and a second color, the second color having locations in the second electronic pattern ink, the locations of the second color in the second electronic pattern ink corresponding to the locations of the first pattern holes in the first electronic pattern ink; the third electronic pattern ink including a third color and the second color, the second color having locations in the third electronic pattern ink, the locations of the second color in the third electronic pattern ink corresponding to the locations of the first pattern holes in the first electronic pattern ink.

The processor electronically paints the electronic image region by electronically painting, using the first electronic pattern ink, the foreground of the first electronic image; electronically painting, using the second electronic pattern ink, the background of the first electronic image; and electronically painting, using the third electronic pattern ink, the foreground of the second electronic image.

The print engine renders, using marking materials, the electronic image region on the recording medium such that the first electronic image may be visible when a relative angle between an observer's viewing angle and an angle of illuminating the recording medium by an illumination source may be a first angle and the second electronic image may be visible when a relative angle between an observer's viewing angle and an angle of illuminating the recording medium by an illumination source may be a second angle, the second angle being not equal to the first angle, the first electronic image not being visible when the relative angle between an observer's viewing angle and an angle of illuminating the recording medium by an illumination source may be the second angle.

The rendered foreground of the first electronic image may be a substantially rough surface. The rendered background of the first electronic image may be a substantially smooth surface. The rendered intersection of the foreground of the first electronic image and the foreground of the second electronic image may be a substantially smooth surface. The rendered intersection of the background of the first electronic image and the foreground of the second electronic image may be a substantially smooth surface.

A recording medium includes a substrate and marking materials formed on the substrate.

The marking materials forms, in a first region of the substrate, a first image being a first color and having a non-smooth structure, the non-smooth structure being realized by first and second locations in the first image, the first locations in the first image being locations where marking material corresponding to the first color may be absent on the substrate, the second locations in the first image being locations where marking material corresponding to the first color may be formed on the substrate, the first locations of the first image having a first marking material height, the second locations of the first image having a second marking material height, the first marking material height of the first locations of the first image not being equal to the second marking material height of the second locations of the first image.

The marking materials forms, in a second region of the substrate, a second image being the first color and a second color and having a smooth structure, the smooth structure being realized by first and second locations in the second image, the first locations in the second image being locations where marking material corresponding to the first color may be formed on the substrate, the second locations in the second image being locations where marking material corresponding to the second color may be formed on the substrate, the first locations of the second image having a first marking material height, the second locations of the second image having a second marking material height, the first marking material height of the first locations of the second image being substantially equal to the second marking material height of the second locations of the second image.

The marking materials forms, in a third region of the substrate, a third image being a third color and the second color and having a smooth structure, the smooth structure being realized by first and second locations in the third image, the first locations in the third image being locations where marking material corresponding to the third color may be formed on the substrate, the second locations in the third image being locations where marking material corresponding to the second color may be formed on the substrate, the first locations of the third image having a first marking material height, the second locations of the third image having a second marking material height, the first marking material height of the first locations of the third image being substantially equal to the second marking material height of the second locations of the third image.

The first image is visible when a relative angle between an observer's viewing angle and an angle of illuminating the recording medium by an illumination source may be a first angle. The third image is visible when a relative angle between an observer's viewing angle and an angle of illuminating the recording medium by an illumination source may be a second angle, the second angle being not equal to the first angle. The first image is not visible when the relative angle between an observer's viewing angle and an angle of illuminating the recording medium by an illumination source may be the second angle.

A method for rendering gloss effect image patterns on a recording medium electronically creates an electronic image region; electronically creates a first electronic image having a background and a foreground; electronically creates a second electronic image having a foreground; electronically creates a first electronic pattern ink, the first electronic pattern ink including a first color and first pattern holes, the first pattern holes having locations in the first electronic pattern ink, the first pattern holes being locations in the first electronic pattern ink where the first color may be absent; electronically creates a second electronic pattern ink, the second electronic pattern ink including the first color and a second color, the second color having locations in the second electronic pattern ink, the locations of the second color in the second electronic pattern ink corresponding to the locations of the first pattern holes in the first electronic pattern ink; electronically creates a third electronic pattern ink, the third electronic pattern ink including a third color and third pattern holes, the third pattern holes having locations in the third electronic pattern ink, the third pattern holes being locations in the third electronic pattern ink where the third color may be absent; electronically paints the electronic image region by electronically painting, using the first electronic pattern ink, the background of the first electronic image, electronically painting, using the second electronic pattern ink, the foreground of the first electronic image, and electronically painting, using the third electronic pattern ink, the foreground of the second electronic image; and renders, using marking materials, the electronic image region on the recording medium such that the first electronic image may be visible when a relative angle between an observer's viewing angle and an angle of illuminating the recording medium by an illumination source may be a first angle and the second electronic image may be visible when a relative angle between an observer's viewing angle and an angle of illuminating the recording medium by an illumination source may be a second angle, the second angle being not equal to the first angle, the second electronic image not being visible when the relative angle between an observer's viewing angle and an angle of illuminating the recording medium by an illumination source may be the first angle.

The locations of the third pattern holes in the third electronic pattern ink may correspond to the locations of the first pattern holes in the first electronic pattern ink. The rendered foreground of the first electronic image may be a substantially smooth surface. The rendered background of the first electronic image may be a substantially rough surface. The rendered intersection of the foreground of the first electronic image and the foreground of the second electronic image may be a substantially rough surface. The rendered intersection of the background of the first electronic image and the foreground of the second electronic image may be a substantially rough surface.

A system for rendering gloss effect image patterns on a recording medium includes a processor and a print engine.

The processor electronically creates an electronic image region, a first electronic image having a background and a foreground, a second electronic image having a foreground, a first electronic pattern ink, a second electronic pattern ink, and a third electronic pattern ink; the first electronic pattern ink including a first color and first pattern holes, the first pattern holes having locations in the first electronic pattern ink, the first pattern holes being locations in the first electronic pattern ink where the first color may be absent the second electronic pattern ink including the first color and a second color, the second color having locations in the second electronic pattern ink, the locations of the second color in the second electronic pattern ink corresponding to the locations of the first pattern holes in the first electronic pattern ink; the third electronic pattern ink including a third color and third pattern holes, the third pattern holes having locations in the third electronic pattern ink, the third pattern holes being locations in the third electronic pattern ink where the third color may be absent.

The processor electronically paints the electronic image region by electronically painting, using the first electronic pattern ink, the background of the first electronic image; electronically painting, using the second electronic pattern ink, the foreground of the first electronic image; and electronically painting, using the third electronic pattern ink, the foreground of the second electronic image only.

The print engine renders, using marking materials, the electronic image region on the recording medium such that the first electronic image may be visible when a relative angle between an observer's viewing angle and an angle of illuminating the recording medium by an illumination source may be a first angle and the second electronic image may be visible when a relative angle between an observer's viewing angle and an angle of illuminating the recording medium by an illumination source may be a second angle, the second angle being not equal to the first angle, the second electronic image not being visible when the relative angle between an observer's viewing angle and an angle of illuminating the recording medium by an illumination source may be the first angle.

The locations of the third pattern holes in the third electronic pattern ink may correspond to the locations of the first pattern holes in the first electronic pattern ink. The rendered foreground of the first electronic image may be a substantially smooth surface. The rendered background of the first electronic image may be a substantially rough surface. The rendered intersection of the foreground of the first electronic image and the foreground of the second electronic image may be a substantially rough surface. The rendered intersection of the background of the first electronic image and the foreground of the second electronic image may be a substantially rough surface.

A recording medium includes a substrate and marking materials formed on the substrate.

The marking materials forms, in a first region of the substrate, a first image being a first color and having a non-smooth structure, the non-smooth structure being realized by first and second locations in the first image, the first locations in the first image being locations where marking material corresponding to the first color may be absent on the substrate, the second locations in the first image being locations where marking material corresponding to the first color may be formed on the substrate, the first locations of the first image having a first marking material height, the second locations of the first image having a second marking material height, the first marking material height of the first locations of the first image not being equal to the second marking material height of the second locations of the first image.

The marking materials forms, in a second region of the substrate, a second image being the first color and a second color and having a smooth structure, the smooth structure being realized by first and second locations in the second image, the first locations in the second image being locations where marking material corresponding to the first color may be formed on the substrate, the second locations in the second image being locations where marking material corresponding to the second color may be formed on the substrate, the first locations of the second image having a first marking material height, the second locations of the second image having a second marking material height, the first marking material height of the first locations of the second image being substantially equal to the second marking material height of the second locations of the second image.

The marking materials forms, in a third region of the substrate, a third image being a third color and having a non-smooth structure, the non-smooth structure being realized by first and second locations in the third image, the first locations in the third image being locations where marking material corresponding to the third color may be absent on the substrate, the second locations in the third image being locations where marking material corresponding to the third color may be formed on the substrate, the first locations of the third image having a first marking material height, the second locations of the third image having a second marking material height, the first marking material height of the first locations of the third image not being equal to the second marking material height of the second locations of the third image.

The second image is visible when a relative angle between an observer's viewing angle and an angle of illuminating the recording medium by an illumination source may be a first angle. The third image is visible when a relative angle between an observer's viewing angle and an angle of illuminating the recording medium by an illumination source may be a second angle, the second angle being not equal to the first angle. The third image is not visible when the relative angle between an observer's viewing angle and an angle of illuminating the recording medium by an illumination source may be the first angle.

A method for rendering gloss effect image patterns on a recording medium electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region to create an electronic image region background having first color locations and holes, the first color locations representing locations in the electronic image region background where the first color may be present, the holes representing locations in the electronic image region background where the first color may be absent; electronically paints a first predetermined portion of the holes within the electronic image region background with a second color to create a first image in the electronic image region; electronically replacing a predetermined portion of the first color locations within the electronic image region background with a third color to create a second image in the electronic image region; and renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the second image not being visible when the relative angle between an observer's viewing angle and an angle of illuminating the recording medium by an illumination source may be the first angle.

The marking material associated with the first color and the marking material associated with the second color may create a substantially smooth surface on the recording medium where the first image may be rendered. The marking material associated with the third color may create a substantially rough surface on the recording medium where the rendered first image does not intersect the rendered second image. The marking material associated with the third color and the marking material associated with the second color may create a substantially smooth surface on the recording medium where the rendered first image intersects the rendered second image.

A system for rendering gloss effect image patterns on a recording medium includes a processor and a print engine.

The processor electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region to create an electronic image region background having first color locations and holes, the first color locations representing locations in the electronic image region background where the first color may be present, the holes representing locations in the electronic image region background where the first color may be absent; electronically paints a first predetermined portion of the holes within the electronic image region background with a second color to create a first image in the electronic image region; and electronically replacing a predetermined portion of the first color locations within the electronic image region background with a third color to create a second image in the electronic image region.

The print engine renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the second image not being visible when the relative angle between an observer's viewing angle and an angle of illuminating the recording medium by an illumination source may be the first angle.

The marking material associated with the first color and the marking material associated with the second color may create a substantially smooth surface on the recording medium where the first image may be rendered. The marking material associated with the third color may create a substantially rough surface on the recording medium where the rendered first image does not intersect the rendered second image. The marking material associated with the third color and the marking material associated with the second color may create a substantially smooth surface on the recording medium where the rendered first image intersects the rendered second image.

A method for rendering gloss effect image patterns on a recording medium electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region; electronically paints a first predetermined portion of the holes within the electronic image region with a second color to create an electronic image region background and a first image, the first image being an area in the electronic image region having first color locations and holes, the first color locations representing locations in the electronic image region where the first color may be present, the holes representing locations in the electronic image region where the first color may be absent, the electronic image region background being an area in the electronic image region having first color locations and second color locations, the second color locations representing locations in the electronic image region where the second color may be present; electronically replacing a predetermined portion of the first color locations within the electronic image region with a third color to create a second image in the electronic image region; and renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the first image not being visible when the relative angle between an observer's viewing angle and an angle of illuminating the recording medium by an illumination source may be the second angle.

The marking material associated with the first color and the marking material associated with the second color may create a substantially smooth surface on the recording medium where the electronic image region background may be rendered. The marking material associated with the first color may create a substantially rough surface on the recording medium where the first image may be rendered. The marking material associated with the third color may create a substantially rough surface on the recording medium where the rendered first image intersects the rendered second image.

A system for renders gloss effect image patterns on a recording medium includes a processor and a print engine.

The processor electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region; electronically paints a first predetermined portion of the holes within the electronic image region with a second color to create an electronic image region background and a first image, the first image being an area in the electronic image region having first color locations and holes, the first color locations representing locations in the electronic image region where the first color may be present, the holes representing locations in the electronic image region where the first color may be absent, the electronic image region background being an area in the electronic image region having first color locations and second color locations, the second color locations representing locations in the electronic image region where the second color may be present; and electronically replacing a predetermined portion of the first color locations within the electronic image region with a third color to create a second image in the electronic image region, the second image being an area in the electronic image region having first color locations and third color locations, the third color locations representing locations in the electronic image region where the third color may be present.

The print engine renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the first image not being visible when the relative angle between an observer's viewing angle and an angle of illuminating the recording medium by an illumination source may be the second angle.

The marking material associated with the first color and the marking material associated with the second color may create a substantially smooth surface on the recording medium where the electronic image region background may be rendered. The marking material associated with the first color may create a substantially rough surface on the recording medium where the first image may be rendered. The marking material associated with the third color may create a substantially rough surface on the recording medium where the rendered first image intersects the rendered second image.

A method for rendering gloss effect image patterns on a recording medium electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region to create an electronic image region background having first color locations and holes, the first color locations representing locations in the electronic image region background where the first color may be present, the holes representing locations in the electronic image region background where the first color may be absent; electronically paints a first predetermined portion of the holes within the electronic image region background with a second color to create a first image in the electronic image region; electronically creates a second image; electronically creates a paints mask, the paints mask having holes therein the holes having locations in the paints mask, the holes enabling electronic paints through the holes, the holes corresponding to the first color locations; electronically paints, using the paints mask, the second image with a third color; and renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the second image not being visible when the relative angle between an observer's viewing angle and an angle of illuminating the recording medium by an illumination source may be the first angle.

The marking material associated with the first color and the marking material associated with the second color may create a substantially smooth surface on the recording medium where the first image may be rendered. The marking material associated with the third color may create a substantially rough surface on the recording medium where the rendered first image does not intersect the rendered second image. The marking material associated with the third color and the marking material associated with the second color may create a substantially smooth surface on the recording medium where the rendered first image intersects the rendered second image.

A system for rendering gloss effect image patterns on a recording medium includes a processor and a print engine.

The processor electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region to create an electronic image region background having first color locations and holes, the first color locations representing locations in the electronic image region background where the first color may be present, the holes representing locations in the electronic image region background where the first color may be absent; electronically paints a first predetermined portion of the holes within the electronic image region background with a second color to create a first image in the electronic image region; electronically creates a second image; electronically creates a paints mask, the paints mask having holes therein the holes having locations in the paints mask, the holes enabling electronic paints through the holes, the holes corresponding to the first color locations; and electronically paints, using the paints mask, the second image with a third color.

The print engine renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the second image not being visible when the relative angle between an observer's viewing angle and an angle of illuminating the recording medium by an illumination source may be the first angle.

The marking material associated with the first color and the marking material associated with the second color may create a substantially smooth surface on the recording medium where the first image may be rendered. The marking material associated with the third color may create a substantially rough surface on the recording medium where the rendered first image does not intersect the rendered second image. The marking material associated with the third color and the marking material associated with the second color may create a substantially smooth surface on the recording medium where the rendered first image intersects the rendered second image.

A method for rendering gloss effect image patterns on a recording medium electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region; electronically paints a first predetermined portion of the holes within the electronic image region with a second color to create an electronic image region background and a first image, the first image being an area in the electronic image region having first color locations and holes, the first color locations representing locations in the electronic image region where the first color may be present, the holes representing locations in the electronic image region where the first color may be absent, the electronic image region background being an area in the electronic image region having first color locations and second color locations, the second color locations representing locations in the electronic image region where the second color may be present; electronically creates a second image; electronically creates a paints mask, the paints mask having holes therein, the holes having locations in the paints mask, the holes enabling electronic paints through the holes, the holes corresponding to the first color locations; electronically paints, using the paints mask, the second image with a third color; and renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the first image not being visible when the relative angle between an observer's viewing angle and an angle of illuminating the recording medium by an illumination source may be the second angle.

The marking material associated with the first color and the marking material associated with the second color may create a substantially smooth surface on the recording medium where the electronic image region background may be rendered. The marking material associated with the first color may create a substantially rough surface on the recording medium where the first image may be rendered. The marking material associated with the third color may create a substantially rough surface on the recording medium where the rendered first image intersects the rendered second image.

A system for rendering gloss effect image patterns on a recording medium includes a processor and a print engine.

The processor electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region; electronically paints a first predetermined portion of the holes within the electronic image region with a second color to create an electronic image region background and a first image, the first image being an area in the electronic image region having first color locations and holes, the first color locations representing locations in the electronic image region where the first color may be present, the holes representing locations in the electronic image region where the first color may be absent, the electronic image region background being an area in the electronic image region having first color locations and second color locations, the second color locations representing locations in the electronic image region where the second color may be present; electronically creates a second image; electronically creates a paints mask, the paints mask having holes therein the holes having locations in the paints mask, the holes enabling electronic paints through the holes, the holes corresponding to the first color locations; and electronically paints, using the paints mask, the second image with a third color.

The print engine renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the first image not being visible when the relative angle between an observer's viewing angle and an angle of illuminating the recording medium by an illumination source may be the second angle.

The marking material associated with the first color and the marking material associated with the second color may create a substantially smooth surface on the recording medium where the electronic image region background may be rendered. The marking material associated with the first color may create a substantially rough surface on the recording medium where the first image may be rendered. The marking material associated with the third color may create a substantially rough surface on the recording medium where the rendered first image intersects the rendered second image.

A method for rendering gloss effect image patterns on a recording medium electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region to create an electronic image region background having first color locations and holes, the first color locations representing locations in the electronic image region background where the first color may be present, the holes representing locations in the electronic image region background where the first color may be absent; electronically paints a first predetermined portion of the holes within the electronic image region background with a second color to create a first image in the electronic image region; electronically creates a second electronic pattern ink, the second electronic pattern ink including a third color and holes, the holes representing locations in the second electronic pattern ink where the third color may be absent; electronically creates a second image; electronically paints, using the second electronic pattern ink, the second image; and renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the second image not being visible when the relative angle between an observer's viewing angle and an angle of illuminating the recording medium by an illumination source may be the first angle.

The locations of the holes in the second electronic pattern ink may correspond to locations of the holes in the first electronic pattern ink. The marking material associated with the first color and the marking material associated with the second color may create a substantially smooth surface on the recording medium where the first image may be rendered. The marking material associated with the third color may create a substantially rough surface on the recording medium where the rendered first image intersects the rendered second image.

A system for rendering gloss effect image patterns on a recording medium includes a processor and a print engine.

The processor electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region to create an electronic image region background having first color locations and holes, the first color locations representing locations in the electronic image region background where the first color may be present, the holes representing locations in the electronic image region background where the first color may be absent; electronically paints a first predetermined portion of the holes within the electronic image region background with a second color to create a first image in the electronic image region; electronically creates a second electronic pattern ink, the second electronic pattern ink including a third color and holes, the holes representing locations in the second electronic pattern ink where the third color may be absent; electronically creates a second image; electronically paints, using the second electronic pattern ink, the second image.

The print engine renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the second image not being visible when the relative angle between an observer's viewing angle and an angle of illuminating the recording medium by an illumination source may be the first angle.

The locations of the holes in the second electronic pattern ink may correspond to locations of the holes in the first electronic pattern ink. The marking material associated with the first color and the marking material associated with the second color may create a substantially smooth surface on the recording medium where the first image may be rendered. The marking material associated with the third color may create a substantially rough surface on the recording medium where the rendered first image intersects the rendered second image.

A method for renders gloss effect image patterns on a recording medium electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region; electronically paints a first predetermined portion of the holes within the electronic image region with a second color to create an electronic image region background and a first image, the first image being an area in the electronic image region having first color locations and holes, the first color locations representing locations in the electronic image region where the first color may be present, the holes representing locations in the electronic image region where the first color may be absent, the electronic image region background being an area in the electronic image region having first color locations and second color locations, the second color locations representing locations in the electronic image region where the second color may be present; electronically creates a second electronic pattern ink, the second electronic pattern ink including the second color and a third color; electronically creates a second image; electronically paints, using the second electronic pattern ink, the second image; and renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the first image not being visible when the relative angle between an observer's viewing angle and an angle of illuminating the recording medium by an illumination source may be the second angle.

The marking material associated with the first color and the marking material associated with the second color may create a substantially smooth surface on the recording medium where the electronic image region background may be rendered. The marking material associated with the first color may create a substantially rough surface on the recording medium where the first image may be rendered. The marking material associated with the third color and the marking material associated with the second color may create a substantially smooth surface on the recording medium where the rendered first image intersects the rendered second image.

A system for rendering gloss effect image patterns on a recording medium includes a processor and a print engine.

The processor electronically creates a first electronic pattern ink, the first electronic pattern ink including a first color and holes, the holes representing locations in the first electronic pattern ink where the first color may be absent; electronically creates an electronic image region; electronically paints, using the first electronic pattern ink, the electronic image region; electronically paints a first predetermined portion of the holes within the electronic image region with a second color to create an electronic image region background and a first image, the first image being an area in the electronic image region having first color locations and holes, the first color locations representing locations in the electronic image region where the first color may be present, the holes representing locations in the electronic image region where the first color may be absent, the electronic image region background being an area in the electronic image region having first color locations and second color locations, the second color locations representing locations in the electronic image region where the second color may be present; electronically creates a second electronic pattern ink, the second electronic pattern ink including the second color and a third color; electronically creates a second image; and electronically paints, using the second electronic pattern ink, the second image.

The print engine renders, using marking materials, the electronic image region on the recording medium such that the first image may be visible when a relative angle between an observer's viewing angle and an angle of illuminating the recording medium by an illumination source may be a first angle and the second image may be visible when a relative angle between an observer's viewing angle and an angle of illuminating the recording medium by an illumination source may be a second angle, the second angle being not equal to the first angle, the first image not being visible when the relative angle between an observer's viewing angle and an angle of illuminating the recording medium by an illumination source may be the second angle.

The marking material associated with the first color and the marking material associated with the second color may create a substantially smooth surface on the recording medium where the electronic image region background may be rendered. The marking material associated with the first color may create a substantially rough surface on the recording medium where the first image may be rendered. The marking material associated with the third color and the marking material associated with the second color may create a substantially smooth surface on the recording medium where the rendered first image intersects the rendered second image.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A recording medium comprising:
   a substrate; and
   marking materials formed on said substrate;
   said marking materials forming, in a first region of said substrate, a first image being a first color and having a non-smooth structure, said non-smooth structure being realized by first and second locations in said first image, said first locations in said first image being locations where marking material corresponding to said first color is absent on said substrate, said second locations in said first image being locations where marking material corresponding to said first color is formed on said substrate, said first locations of said first image having a first marking material height, said second locations of said first image having a second marking material height, said first marking material height of said first locations of said first image not being equal to said second marking material height of said second locations of said first image;
   said marking materials forming, in a second region of said substrate, a second image being a second color, said second color being formed of marking materials having a third marking height;
   said first region of said substrate having a portion thereof intersect a portion of said second region, the intersection of said portion of said first region of said substrate and said portion of said second region having a smooth structure, said smooth structure being realized by said first marking material height of said first locations of said first region being substantially equal to said third marking material height of said second color;
   said marking materials forming, in a third region of said substrate, a third image being a third color, said third color being formed of marking materials having a fourth marking height;
   said third region of said substrate having a portion thereof intersect a portion of said second region, the intersection of said portion of said third region of said substrate and said portion of said second region having a smooth structure, said smooth structure being realized by said third marking material height of said second color being substantially equal to said fourth marking material height of said third color;
   said second image being visible when a relative angle between an observer's viewing angle and an angle of illuminating the recording medium by an illumination source is a first angle;
   said third image being visible when a relative angle between an observer's viewing angle and an angle of illuminating the recording medium by an illumination source is a second angle, said second angle being not equal to said first angle;
   said third image not being visible when the relative angle between an observer's viewing angle and an angle of illuminating the recording medium by an illumination source is said first angle.

2. The recording medium as claimed in claim 1, wherein the marking materials formed first region does not intersect the marking materials formed third region.

3. The recording medium as claimed in claim 1, wherein the intersection of said portion of said second region and said portion of said third region is adjacent to the intersection of said portion of said second region and said portion of said first region.

4. The recording medium as claimed in claim 1, wherein the intersection of said portion of said second region and said portion of said third region and the intersection of said portion of said second region and said portion of said first region form an alphanumeric character.

5. The recording medium as claimed in claim 1, wherein said third region and the intersection of said portion of said second region and said portion of said third region form an alphanumeric character.

6. The recording medium as claimed in claim 1, wherein the intersection of said portion of said second region and said portion of said third region and the intersection of said portion of said second region and said portion of said first region form security mark.

7. The recording medium as claimed in claim 1, wherein said third region and the intersection of said portion of said second region and said portion of said third region form security mark.

8. A recording medium comprising:
   a substrate; and
   marking materials formed on said substrate;
   said marking materials forming, in a first region of said substrate, a first image being a first color and having a non-smooth structure, said non-smooth structure being realized by first and second locations in said first image, said first locations in said first image being locations where marking material corresponding to said first color is absent on said substrate, said second locations in said first image being locations where marking material corresponding to said first color is formed on said substrate, said first locations of said first image having a first marking material height, said second locations of said first image having a second marking material height, said first marking material height of said first locations of said first image not being equal to said second marking material height of said second locations of said first image;
   said marking materials forming, in a second region of said substrate, a second image being a second color, said second color being formed of marking materials having a third marking height;
   said first region of said substrate having a portion thereof intersect a portion of said second region, the intersection of said portion of said first region of said substrate and said portion of said second region having a smooth structure, said smooth structure being realized by said first marking material height of said first locations of said first region being substantially equal to said third marking material height of said second color;
   said marking materials forming, in a third region of said substrate, a third image being a third color, said third color being formed of marking materials having a fourth marking height;
   said third region of said substrate having a portion thereof intersect a portion of said second region, the intersection of said portion of said third region of said substrate and said portion of said second region having a smooth structure, said smooth structure being realized by said third marking material height of said second color being substantially equal to said fourth marking material height of said third color;
   said second image being visible when a relative angle between an observer's viewing angle and an angle of illuminating the recording medium by an illumination source is a first angle;
   said first and third images being visible when a relative angle between an observer's viewing angle and an angle of illuminating the recording medium by an illumination source is a second angle, said second angle being not equal to said first angle;
   said first and third image not being visible when the relative angle between an observer's viewing angle and an angle of illuminating the recording medium by an illumination source is said first angle.

9. The recording medium as claimed in claim 8, wherein the marking materials formed first region does not intersect the marking materials formed third region.

10. The recording medium as claimed in claim 8, wherein the intersection of said portion of said second region and said portion of said third region is adjacent to the intersection of said portion of said second region and said portion of said first region.

11. The recording medium as claimed in claim 8, wherein the intersection of said portion of said second region and said portion of said third region and the intersection of said portion of said second region and said portion of said first region form an alphanumeric character.

12. The recording medium as claimed in claim 8, wherein said third region and the intersection of said portion of said second region and said portion of said third region form an alphanumeric character.

13. The recording medium as claimed in claim 8, wherein the intersection of said portion of said second region and said portion of said third region and the intersection of said portion of said second region and said portion of said first region form security mark.

14. The recording medium as claimed in claim 8, wherein said third region and the intersection of said portion of said second region and said portion of said third region form security mark.

* * * * *